United States Patent
Ishikawa

(10) Patent No.: US 6,553,112 B2
(45) Date of Patent: Apr. 22, 2003

(54) CALL CENTER SYSTEM

(75) Inventor: Yoshio Ishikawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/038,387

(22) Filed: Mar. 11, 1998

(65) Prior Publication Data
US 2001/0048739 A1 Dec. 6, 2001

(30) Foreign Application Priority Data

Jul. 28, 1997 (JP) ............................................. 9-201815

(51) Int. Cl.⁷ ............................................... H04M 3/00
(52) U.S. Cl. ........................... 379/265.02; 379/265.01; 379/88.19; 379/88.21; 379/211.01; 379/212.01
(58) Field of Search .................... 379/49, 206, 207, 379/210, 211, 212, 228, 265, 309, 88.21, 88.24, 93.23, 265.01, 265.02, 265.09, 88.18, 88.19

(56) References Cited

U.S. PATENT DOCUMENTS

| | | | | |
|---|---|---|---|---|
| 5,073,890 A | * | 12/1991 | Danielsen | 370/270 |
| 5,103,449 A | * | 4/1992 | Jolissaint | 370/384 |
| 5,161,180 A | * | 11/1992 | Chavous | 379/45 |
| 5,181,239 A | * | 1/1993 | Jolissaint | 379/93.25 |
| 5,309,504 A | * | 5/1994 | Morganstein | 379/88.01 |
| 5,339,351 A | * | 8/1994 | Hoskinson et al. | 379/45 |
| 5,469,504 A | * | 11/1995 | Blaha | 379/265 |
| 5,572,577 A | * | 11/1996 | Harrila | 379/67 |
| 5,621,789 A | * | 4/1997 | McCalmont et al. | 379/265.06 |
| 5,740,240 A | * | 4/1998 | Jolissaint | 379/265.02 |
| 5,923,745 A | * | 7/1999 | Hurd | 379/265.02 |
| 5,987,116 A | * | 11/1999 | Petrunka et al. | 379/265 |
| 6,046,762 A | * | 4/2000 | Sonesh et al. | 348/14.11 |

FOREIGN PATENT DOCUMENTS

| | | |
|---|---|---|
| JP | 396160 | 4/1991 |
| JP | 456558 | 2/1992 |
| JP | 4165464 | 6/1992 |
| JP | 5266045 | 10/1993 |

* cited by examiner

Primary Examiner—Harry S. Hong
Assistant Examiner—Bing Bui
(74) Attorney, Agent, or Firm—Katten Muchin Zavis & Rosenman

(57) ABSTRACT

A signal receiving unit receives call information (termination trunk number) of a termination call, a user number, and so forth from an originator. Thereafter, the signal receiving unit transfers the termination call to an operator unit through a PBX. The operator unit receives the call information of the transfer call and inquires of the signal receiving unit about the user number and so forth with a key of the call information. In addition, the operator unit searches user information with a key of the user number from a database and displays the searched result. Even if the PBX is using an ACD function or the like, user identification information received by the signal receiving unit can be sent to the operator unit as a transfer destination.

29 Claims, 18 Drawing Sheets

CALL CENTER SYSTEM

BACKGROUND OF THE INVENTION

1. Field of the Invention

The present invention relates to a call center system having a function for displaying user information corresponding to a user number dialed by a user.

2. Description of the Related Art

As competitions in the telecommunication field are becoming severe in recent years, to offer users better services, a function for displaying user information upon occurrence of a termination call of a user to a call center is being required.

In this case, it is necessary to cause each user to dial various kinds of user identification numbers such as a user number, to search the user information from a database corresponding to the dialed numbers, and to display the searched result.

In a related art reference of such a call center system, after an operator thereof hears the user number and so forth of a user who has called the call center, the operator inputs the user number and so forth to a user information system with a keyboard.

However, in the related art reference, there is a problem that it is slow to display the user information because the user number and so forth are input after a call is terminated to the call center.

And, accompanied with the development of DTMF (Dual Tone Multi-Frequency) signal receiving unit (referred to as IVR: Interactive Voice Response), in the related art reference, the following system is considered. The system is that: after a call is terminated to the IVR and a user number and so forth have been received to the IVR, the termination call is transferred to an operator and the user number and so forth received by the IVR is sent to the operator.

However, in the latter related art reference, there is the following problem. The problem is that: in the case that a system is operated by a plurality of operators and the system uses a ACD (Automatic Call Distribution) function of a PBX (Private Branch exchange), when a termination call is transferred from the IVR to one operator, since the transfer destination of the termination call is not explicit outside the PBX, the user number and so forth received by the IVR may not be sent to the operator as the transfer destination.

SUMMARY OF THE INVENTION

The present invention is made from the above-described point of view. An object of the present invention is to allow a user number and so forth received by the IVR to be sent to an operator as a transfer destination even if the ACD function of the PBX is being used.

An aspect of the present invention presupposes a call center system for switching a termination call to one of a plurality of operator units.

This aspect has the following units.

First, a private branch exchange exchanges a call.

Next, a signal receiving unit has the functions of receiving call information that identifies the termination call from the private branch exchange, receiving user identification information from an originator corresponding to the termination call with a DTMF signal, storing the user identification information along with the call information corresponding to the termination call, receiving the user identification information and then causing the private branch exchange to transfer the termination call to one of the operator units, and sending the stored user identification information corresponding to a first inquiry that identifies the call information received from a network to an originator of the inquiry through the network.

Next, a database unit stores user information corresponding to the user identification information.

Each of the operator units has the functions of receiving call information of the termination call designated as a transfer call by the signal receiving unit from the private branch exchange, sending a first inquiry that identifies the received call information and that inquires the user identification information to the signal receiving unit through the network, sending a second inquiry that identifies user identification information received from the signal receiving unit corresponding to the first inquiry and that inquires the user information to the database unit, displaying the user information received from the database unit corresponding to the second inquiry, and terminating the termination call designated as the transfer call by the signal receiving unit and allowing an operator of the relevant operator unit to communicate with the originator of the termination call.

According to the structure of an aspect of the present invention, call information of a termination call is sent to the signal receiving unit and an operator unit as a transfer destination. In addition, after the signal receiving unit has received and stored user identification information, the operator unit as the transfer destination inquires of the signal receiving unit about the user identification information with a key of call information. Thus, even if the private branch exchange is using the ACD function and so forth, the user identification information received by the signal receiving unit can be sent to an operator as a transfer destination.

BRIEF DESCRIPTION OF THE DRAWINGS

The other objects and features of the present invention will be easily understood by the description of best mode embodiments and the attached drawings.

DESCRIPTION OF PREFERRED EMBODIMENTS

Theory of Operation

The present invention presupposes a call center system for switching a termination call to one of a plurality of operator units.

Figure 1:
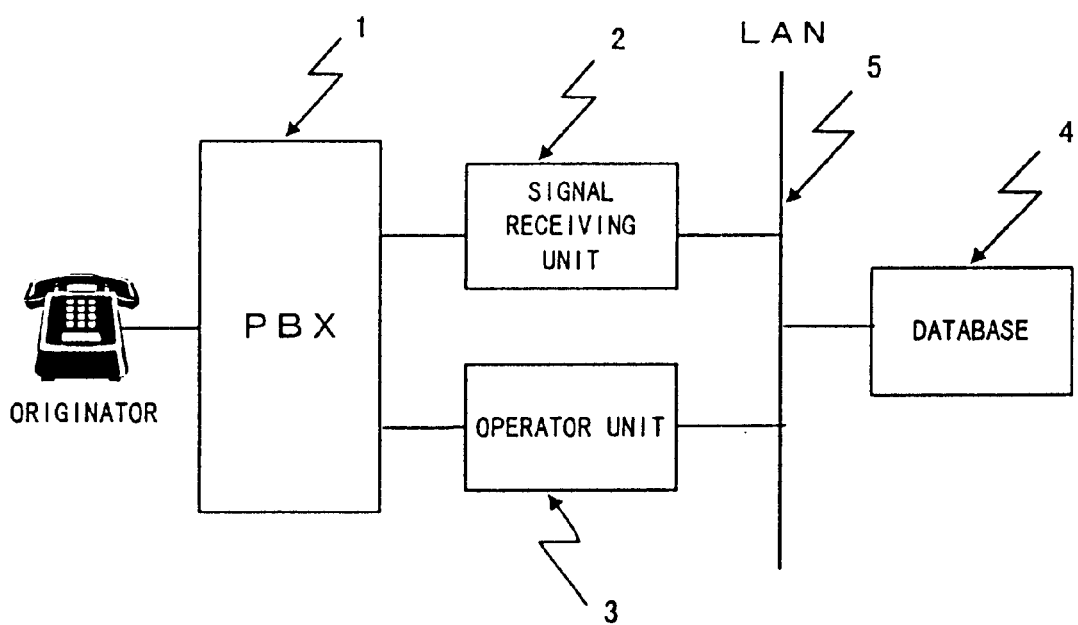
FIG. 1 is a first block diagram of the present invention.

FIG. 1 is a block diagram showing a theoretical structure of a first aspect of the present invention.

A private branch exchange (PBX) 1 exchanges a call.

A signal receiving unit 2 has the functions of receiving call information that identifies the termination call from the private branch exchange 1, receiving user identification information (user number and so forth) from an originator corresponding to the termination call with a DTMF signal, storing the user identification information along with the call information corresponding to the termination call, receiving the user identification information and then causing the private branch exchange 1 to transfer the termination call to one of the operator units 3, and sending the stored user identification information corresponding to a first inquiry that identifies the call information received from a network (LAN) 5 to an originator of the inquiry through the network 5.

A database unit 4 stores user information corresponding to the user identification information.

Each of the operator units 3 has the functions of receiving call information of the termination call designated as a transfer call by the signal receiving unit 2 from the private branch exchange 1, sending a first inquiry that identifies the received call information and that inquires the user identification information to the signal receiving unit through the network 5, sending a second inquiry that identifies user identification information received from the signal receiving unit 2 corresponding to the first inquiry and that inquires the user information to the database unit 4, displaying the user information received from the database unit 4 corresponding to the second inquiry, and terminating the termination call designated as the transfer call by the signal receiving unit 2 and allowing an operator of the relevant operator unit 3 to communicate with the originator of the termination call.

According to the structure of the first aspect of the present invention, call information of a termination call is sent to the signal receiving unit 2 and an operator unit 3 as a transfer destination. In addition, after the signal receiving unit 2 has received and stored user identification information, the operator unit 3 as the transfer destination inquires of the signal receiving unit 2 about the user identification information with a key of call information. Thus, even if the private branch exchange 1 is using the ACD function and so forth, the user identification information received by the signal receiving unit 2 can be sent to an operator as a transfer destination.

Next, a second aspect of the present invention will be described.

In the second aspect of the present invention, a plurality of signal receiving units 2 of the first embodiment are disposed. A user identification information storing unit (not shown) is newly connected to a network 5.

In the structure of the second aspect of the present invention, pair of call information and user identification information received from each signal receiving unit 2 are centralized and stored to the user identification information unit. The operator unit as the transfer designation inquires the user identification information storing unit about the content.

In the structure of the second aspect of the present invention, even if a plurality of signal receiving unit 2 are disposed for improving the capacity of termination calls and the PBX 1 uses the ACD function and so forth, the user identification information received by each signal receiving unit 2 can be sent to an operator as a transfer destination.

Figure 2:
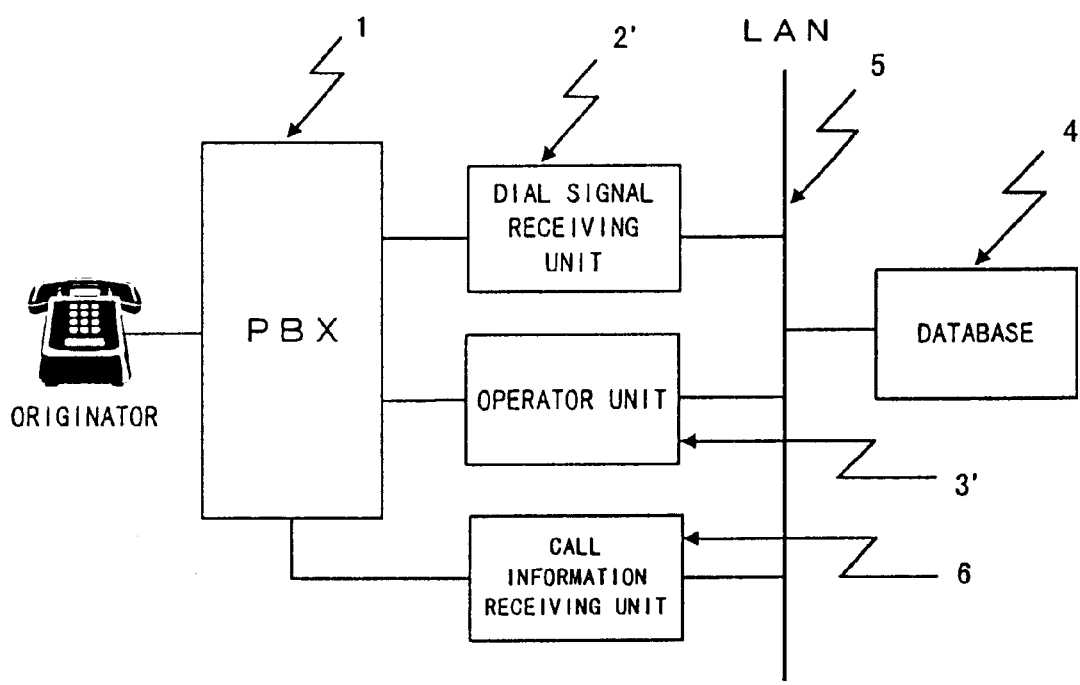
FIG. 2 is a second block diagram of the present invention.

FIG. 2 is a block diagram showing a theoretical structure of a third aspect of the present invention.

A private branch exchange (PBX) 1 exchanges a call.

A user identification information receiving unit 2' (dial signal receiving unit 7) has the functions of receiving user identification information (user number and so forth) of an originator corresponding to a termination call with a DTMF signal from said private branch exchange 1 and storing the user identification information, receiving the user identification information and then causing said private branch exchange 1 to transfer the termination call to one of the operator units 3', and sending the stored user identification information to an originator of a first inquiry through a network (LAN) 5 corresponding to the first inquiry from the network 5.

A call information receiving unit 6 (call information receiving unit 8) has the functions of receiving call information of the termination call designated as a transfer call by said user identification information receiving unit 2' from said private branch exchange 1, sending a first inquiry that identifies the received call information and that inquires the user identification information to said user identification information receiving unit 2' through the network 5, and transferring the user identification information received from said user identification information receiving unit 2' corresponding to the first inquiry to the operator unit 3' designated as a transfer destination by said user identification information receiving unit 2'.

Each of the operator units 3' (business phone 9, operator unit 10) has the functions of sending a second inquiry that identifies the user identification information received from said call information receiving unit 6 and that inquires the user information to a database unit 4, displaying the user information received from the database unit 4 corresponding to the second inquiry, and terminating the termination call designated as the transfer call by said signal receiving unit and allowing an operator of the relevant operator unit to communicate with the originator of the termination call.

In the structure of the third aspect of the present invention, since the call information receiving unit 6 connected to the private branch exchange 1 centralizes and processes call information, the user identification information receiving unit 2' can be structured as a simple signal receiving unit that has only a function for receiving a DTMF signal. In addition, since the operator unit 3' can be also structured with a conventional personal computer, a conventional business phone, and so forth, in case that many operator units 3' are used, the cost of the system can be reduced.

In a fourth aspect of the present invention, a plurality of user identification information receiving units 2 of the third aspect of the present invention are disposed. In addition, a user identification information storing unit (not shown) is newly connected to a network 5.

In the structure of the fourth aspect of the present invention, pair of port information and user identification information received by each user identification information receiving unit 2' is centralized and stored to the user identification storing unit. The call information receiving unit inquires the user identification information storing unit about the content.

According to the above-described structure of the fourth aspect of the present invention, even if a plurality of user identification information receiving units 2' are disposed for improving the capacity of termination calls, the features of the third aspect of the present invention can be effectively used.

In each structure of the aspects of the present invention, when a termination call contains an originator number, the termination call is terminated to the operator unit 3 or 3'. In addition, the originator number as user identification number is sent to the operator unit 3 or 3'. The operator unit 3 or 3' may be structured so as to send a second inquiry that identifies the originator number and that inquires the user information to the database unit 4 directly.

Thus, the present invention can be applied to a system that handles both a situation of which an originator number sending function is available and a situation of which the function is not available.

It should be noted that each unit composing each system is part of the present invention. In addition, the present invention can be applied to a portable record medium storing a program that causes a computer to perform functions accomplished by each unit that composes each of the above-described systems when it was used by each computer composing each unit in each system.

Next, the detailed explanation of preferred embodiments, with reference to the accompanying drawings, preferred embodiments of the present invention will be described.

First Preferred Embodiment of the Present Invention

Figure 3:
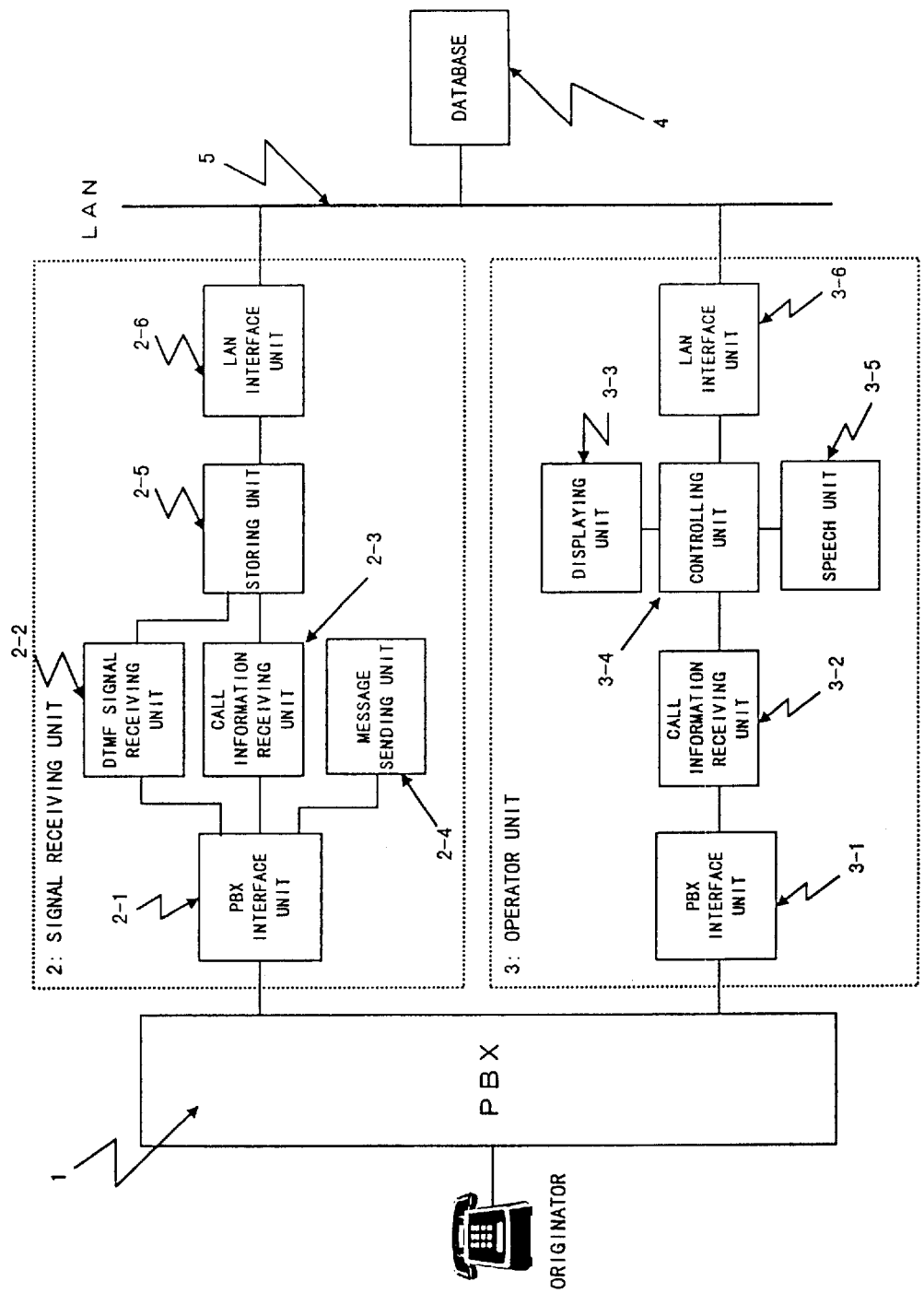
FIG. 3 is a schematic diagram showing the structure of a first preferred embodiment of the present invention.

FIG. 3 is a schematic diagram showing the structure of a first preferred embodiment of the present invention.

The first preferred embodiment of the present invention, generally, comprises a PBX 1, a signal receiving unit 2, a plurality of operator units 3, a database 4, and a LAN 5 which connects the signal receiving unit 2, the operator units 3, and the database 4 to one another.

The PBX 1 selectively connects an external line to an extension line connected to the signal receiving unit 2 and a relevant operator unit 3.

The signal receiving unit 2 comprises a PBX interface unit 2-1, a DTMF signal receiving unit 2-2, a call information receiving unit 2-3, a message sending unit 2-4, a storing unit 2-5, and a LAN interface unit 2-6. The signal receiving unit 2 has a function for receiving call information of a termination call from the PBX 1, a function for receiving a user number and so forth as a DTMF signal from an originator, and a function for sending the received user number and so forth to the operator unit 3 through the LAN 5 corresponding to an inquiry from one operator unit 3.

The operator unit 3 comprises a PBX interface unit 3-1, a call information receiving unit 3-2, a displaying unit 3-3, a controlling unit 3-4, a speech unit 3-5, and a LAN interface unit 3-6. The operator unit 3 has a function for receiving call information of a transfer call from the PBX 1, a function for inquiring of the signal receiving unit 2 about a user number and so forth with a key of received call information, a function for inquiring of the database 4 about user information with a key of the user number and so forth received from the signal receiving unit 2 corresponding to the inquiry, a function for displaying the user information received from the database 4 corresponding to the inquiry, and a function for allowing the operator to communicate with an originator as a user.

As described above, the database 4 has a function for receiving an inquiry with a key of a user number and so forth received from the operator unit 3, a function for searching user information with a key of the user number and so forth, and a function for sending the searched user information to the operator unit 3.

The LAN 5 is a local area network such as the Ethernet and so forth.

Figure 4:
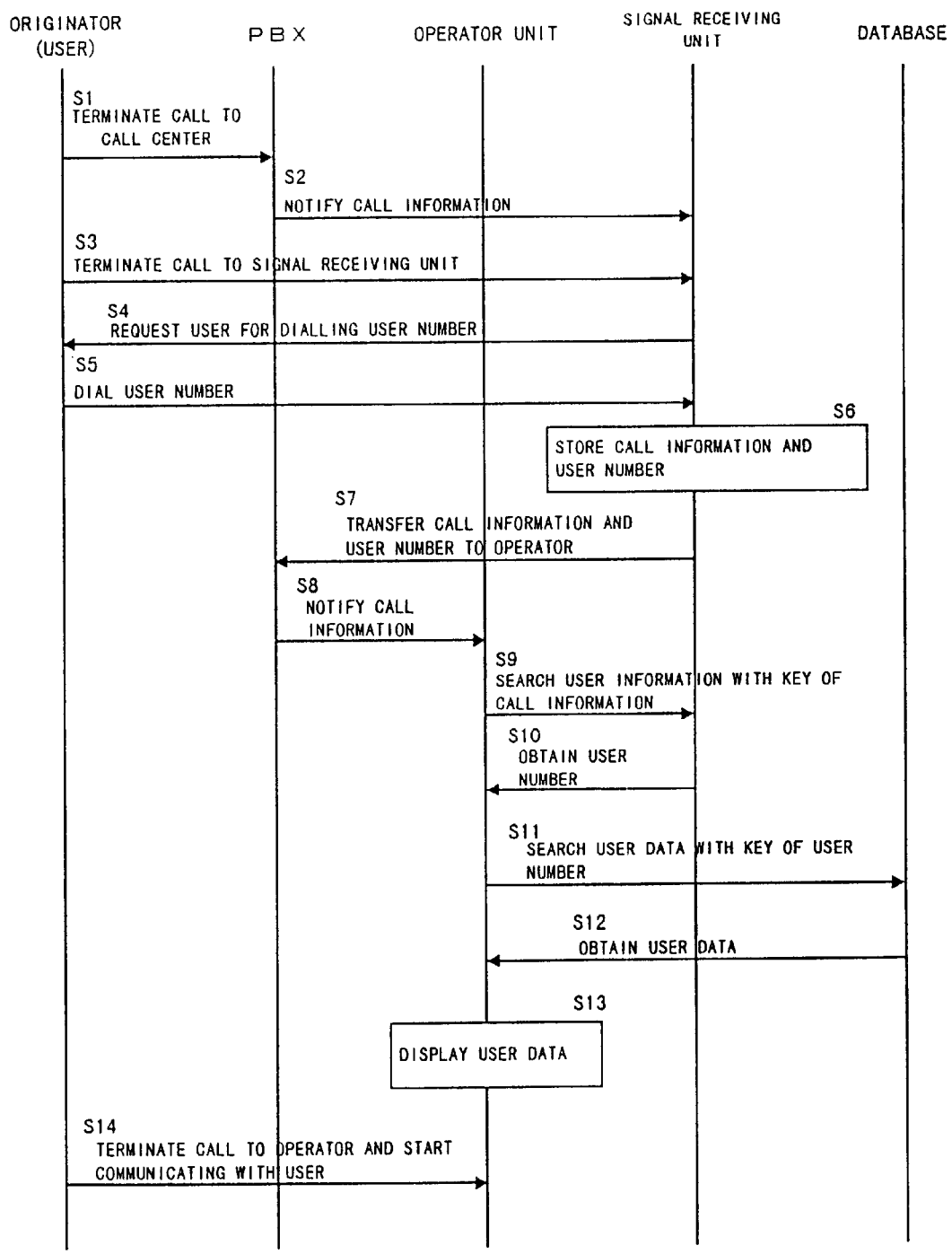
FIG. 4 is a sequence chart of the first preferred embodiment of the present invention.
Figure 5:
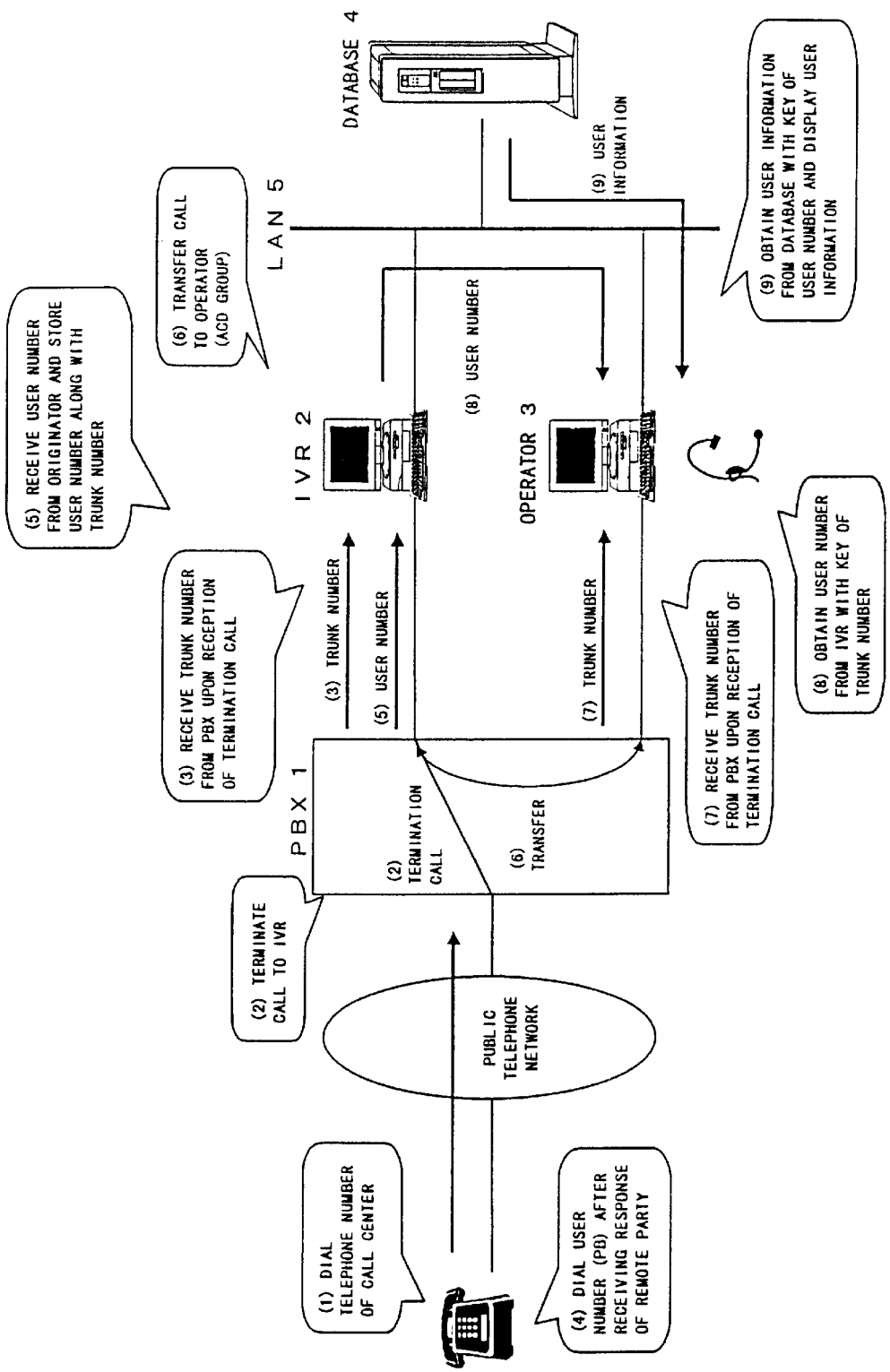
FIG. 5 is a schematic diagram for explaining the operation of the first preferred embodiment of the present invention.
Figure 6:
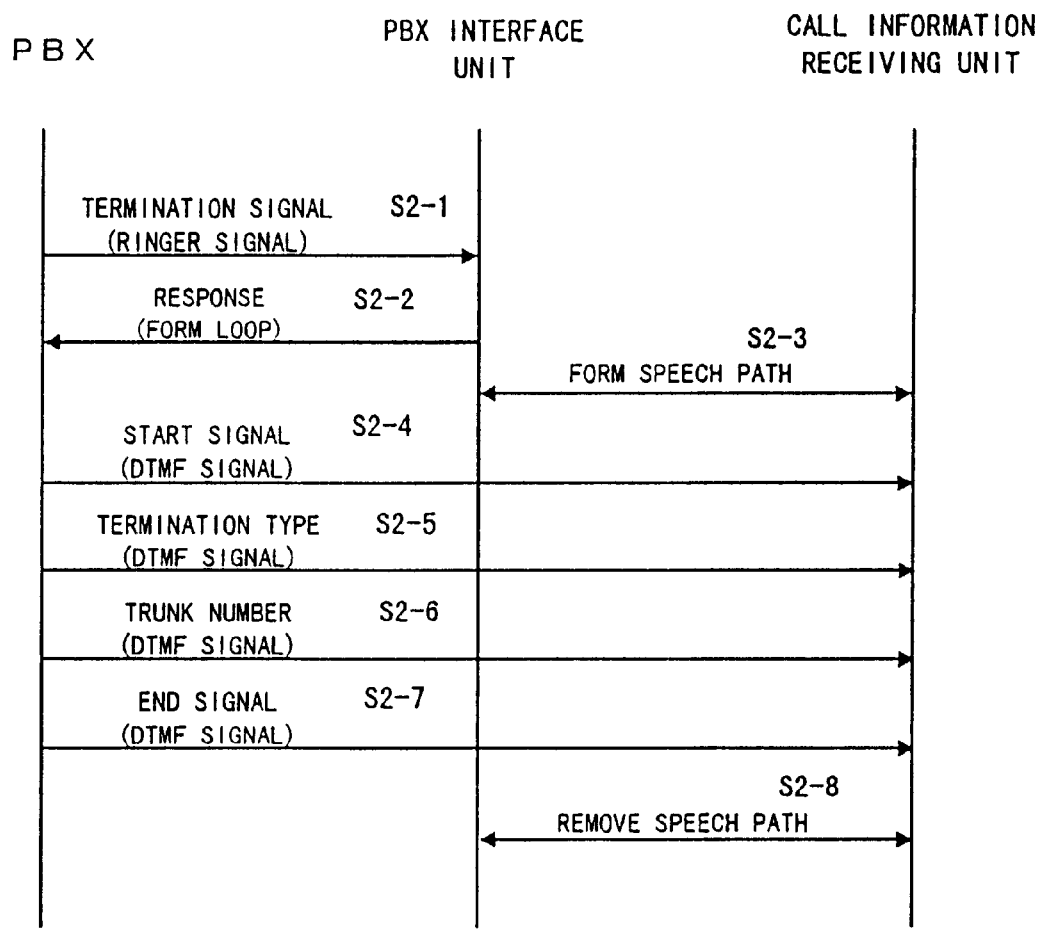
FIG. 6 is a sequence chart of a sending operation of termination trunk number information sent to a signal receiving unit according to the first preferred embodiment of the present invention (with a DTMF signal)
Figure 7:
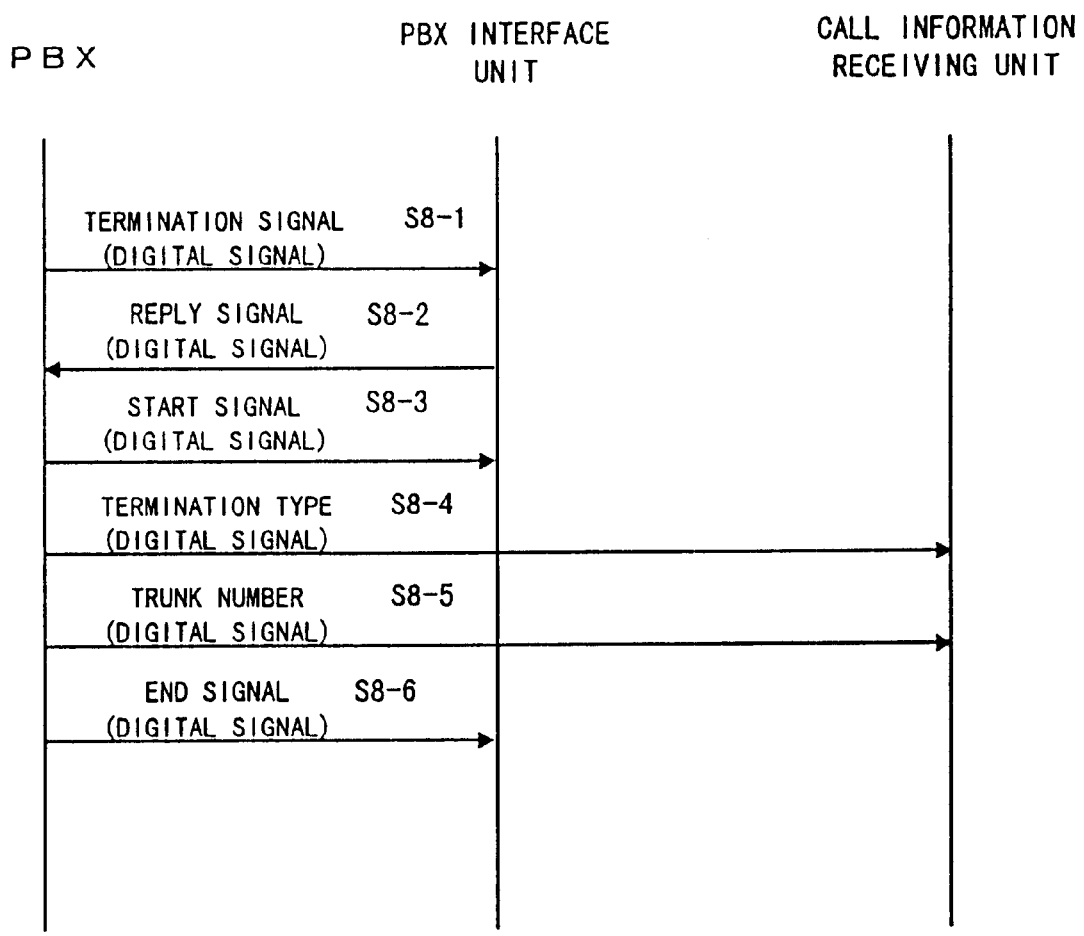
FIG. 7 is a sequence chart of a sending operation of a termination trunk number sent to an operator unit according to the first preferred embodiment of the present invention (with a digital signal)

Next, with reference to FIGS. 4, 5, 6, and 7, the operation of the first preferred embodiment will be described. FIGS. 4, 6, and 7 are sequence charts showing the operation of the first preferred embodiment. FIG. 5 is a schematic diagram for explaining the operation of the first preferred embodiment.

When an originator who is a user of the system dials the telephone number of a call center, the call is terminated to the PBX 1 in the call center through a public telephone network (at step S1 in FIG. 4 and at step (1) in FIG. 5).

The PBX 1 terminates the termination call to the signal receiving unit 2 that is an IVR (at step (2) in FIG. 5).

When the PBX interface unit 2-1 in the signal receiving unit 2 responds to the termination call, the PBX 1 sends a termination trunk number as call information with a DTMF signal to the signal receiving unit 2 and connects the signal receiving unit 2 to the user (at step S2 in FIG. 4 and step (3) in FIG. 5).

FIG. 6 is a sequence chart showing the above described sending operation for the termination trunk number.

First, the PBX 1 sends a termination signal as a ringer signal to the PBX interface unit 2-1 in the signal receiving unit 2 (at step S2-1 in FIG. 6). In response to that, the PBX interface unit 2-1 forms a loop with the PBX 1 and returns a reply to the PBX 1 (at step S2-2 in FIG. 6).

In addition, the PBX interface unit 2-1 forms a speech path with the call information receiving unit 2-3 (at step S2-3 in FIG. 6).

Next, the PBX 1 sends a start signal (at step S24 in FIG. 6), a termination type that represents a direct termination call (at step S2-5 in FIG. 6), a trunk number (at step S2-6 in FIG. 6), and an end signal (at step S2-7 in FIG. 6) with a DTMF signal to the call information receiving unit 2-3 in the signal receiving unit 2 through the PBX interface unit 2-1 in the signal receiving unit 2 in turn.

When the PBX 1 has sent such data to the call information receiving unit 2-3, the speech path between the PBX interface unit 2-1 and the call information receiving unit 2-3 is removed (at step S2-8 in FIG. 6).

As described above, after the PBX 1 has sent the call information that is termination trunk number of the termination call to the signal receiving unit 2 and connected the signal receiving unit 2 to the user, the message sending unit 2-4 in the signal receiving unit 2 sends a message for requesting a user for dialing a user number and so forth to the user through the PBX interface unit 2-1 and the PBX 1 (at step S4 in FIG. 4).

When the user dials the user number and so forth corresponding to this message, the user number and so forth are transferred with a DTMF signal to the DTMF signal receiving unit 2-2 in the signal receiving unit 2 through the PBX 1 and the PBX interface unit 2-1 in the signal receiving unit 2, and they are received there (at step S5 in FIG. 4 and at step (4) in FIG. 5).

As the result of that, in the signal receiving unit 2, with a key of the call information (trunk number) received by the call information receiving unit 2-3, the user number and so forth received by the DTMF signal receiving unit 2-2 is stored in the storing unit 2-5 (at step S6 in FIG. 4 and at step (5) in FIG. 5).

Next, the PBX interface unit 2-1 in the signal receiving unit 2 transfers the termination call to the representative number (ACD group) that represents a plurality of operator units 3 (at step S7 in FIG. 4 and at step (6) in FIG. 5).

The PBX 1 determines a free operator unit 3 using its ACD function, sends the termination trunk number of the transfer call as the call information with a digital signal to the designated operator unit 3, and terminates the transfer call to the operator unit 3 (at step S8 in FIG. 4 and at step (7) in FIG. 5).

FIG. 7 is a sequence chart showing a sending operation of the termination trunk number.

First, the PBX 1 sends the termination signal which is a digital signal, to the PBX interface unit 3-1 in the operator unit 3 (at step S8-1 in FIG. 7). In response to that, the PBX interface unit 3-1 returns a reply signal, which is a digital signal, to the PBX 1 (at step S8-2 in FIG. 7).

Next, the PBX 1 sends the start signal with a digital signal to the PBX interface unit 3-1 in the operator unit 3 (at step S8-3 in FIG. 7). Thereafter, the PBX 1 sends both the termination type, which represents a transfer call from another extension line (at step S3-4 in FIG. 7) and the trunk number (at step S3-5 in FIG. 7) as digital signals to the call information receiving unit 3-2 in the operator unit 3 through the PBX interface unit 3-1. Thereafter, the PBX 1 sends the end signal with a digital signal to the PBX interface unit 2-1 (at step S3-6 in FIG. 7).

As described above, after the PBX 1 has sent the call information as the termination trunk number of the transfer call to the operator unit 3, the controlling unit 3-4 in the operator unit 3 inquires of signal receiving unit 2 about the user number and so forth through the LAN interface unit 3-6 and the LAN 5 with a key of the call information (termination trunk number) received by the call information receiving unit 2-3 (at step S9 in FIG. 4).

A controlling unit (not shown) in the signal receiving unit 2 receives the inquiry through the LAN interface unit 2-6, searches the user number and so forth with a key of the call information contained in the inquiry on the storing unit 2-5, and sends them to the operator unit 3 through the LAN interface unit 2-6 and the LAN 5. The user number and so forth are received by the controlling unit 3-4 through the LAN interface unit 3-6 in the operator unit 3 (at step S10 in FIG. 4 and at step (8) in FIG. 5).

Next, the controlling unit 3-4 in the operator unit 3, inquires of the database 4 about the user information through the LAN interface unit 3-6 and the LAN 5 with a key of the received user number and so forth (at step S11 in FIG. 4).

The database 4 searches the user information with a key of the user number and so forth contained in the inquiry and sends it to the operator unit 3 through the LAN 5.

The user information is received by the controlling unit 3-4 through the LAN interface unit 3-6 in the operator unit 3 (at step S12 in FIG. 4 and at step (9) in FIG. 5). Thereafter, the user information is displayed on the displaying unit 3-3 in the operator unit 3 (at step S13 in FIG. 4).

Next, the controlling unit 3-4 in the operator unit 3 connects the speech unit 3-5 and the user through the PBX interface unit 2-1 and the PBX 1. As a result of that, the speech between the operator and the user is started (at step S14 in FIG. 4).

As described above, in the first preferred embodiment of the present invention, call information (termination trunk number) of a termination call is sent to the signal receiving unit 2 and the operator unit 3 as a transfer destination. In addition, after the signal receiving unit 2 receives and stores the user number and so forth, the operator unit 3 as the transfer destination inquires of the signal receiving unit 2 about the user number and so forth with a key of the call information. By means of that, while the PBX 1 is using the ACD function, the signal receiving unit 2 can send the received user number and so forth to the operator as the transfer destination.

Second Preferred Embodiment of the Present Invention

Figure 8:
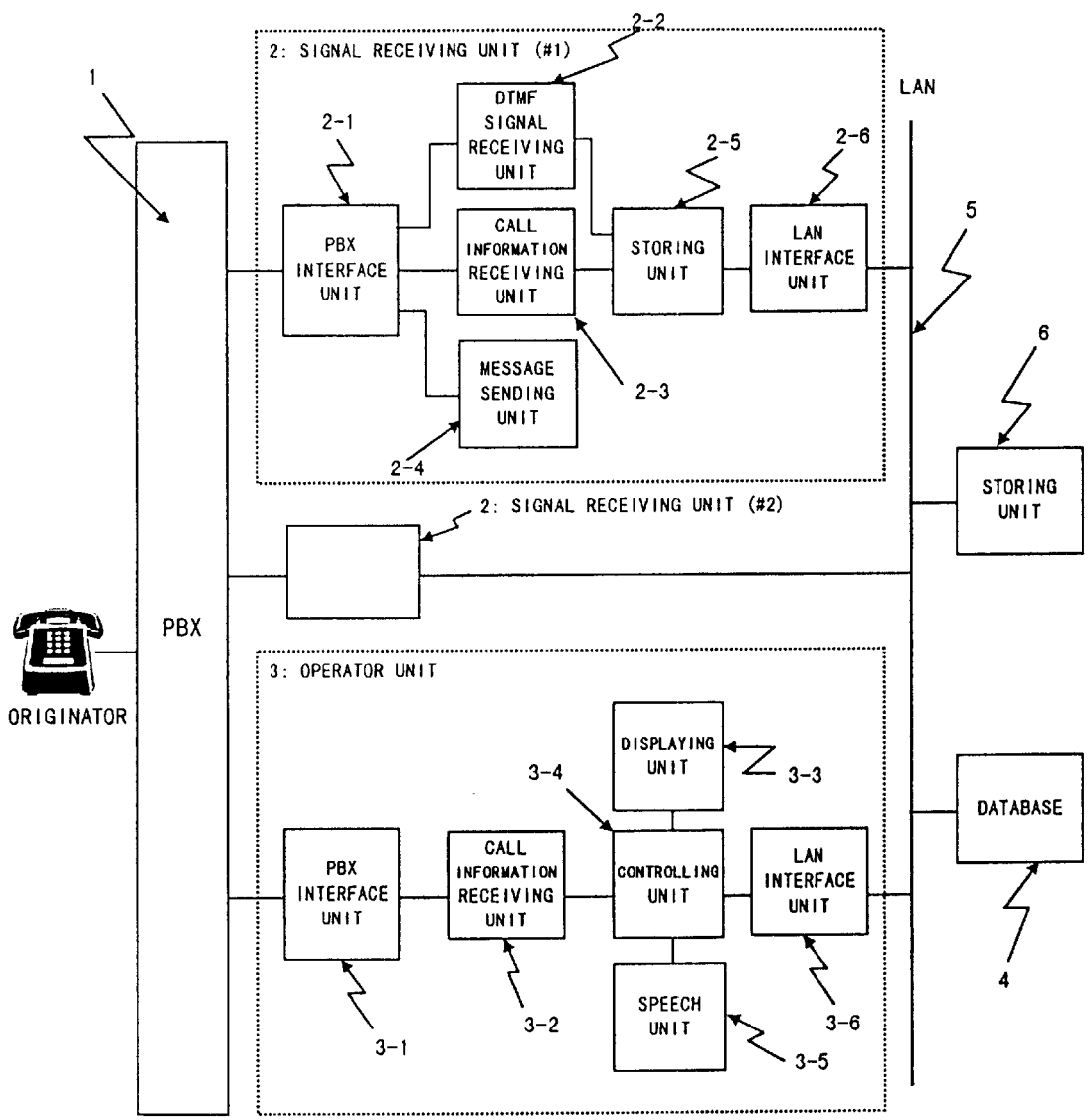
FIG. 8 is a schematic diagram showing the structure of a second preferred embodiment of the present invention.

FIG. 8 is a block diagram showing the structure of a second preferred embodiment of the present invention. In FIG. 8, for simplicity, units similar to those of the first preferred embodiment of the present invention in FIG. 3 are denoted by similar reference numerals.

The difference between the structure shown in FIG. 8 and the structure of the first preferred embodiment shown in FIG. 3 is in that a plurality of signal receiving units 2 are disposed and that a storing unit 6 is newly disposed in a LAN 5.

In the first preferred embodiment of the present invention shown in FIG. 3, pair of call information (termination trunk number) received by the call information receiving unit 2-3 in the signal receiving unit 2 and user number and so forth received by the DTMF signal receiving unit 2-2 in the signal receiving unit 2 are stored to the storing unit 2-5. The operator unit 3 as a transfer destination inquires of the storing unit 2-5 about the content.

On the other hand, in the second preferred embodiment of the present invention shown in FIG. 8, pair of call information (termination trunk number) received by a call information receiving unit 2-3 in each signal receiving unit 2 and user number and so forth received by a DTMF signal receiving unit 2-2 in a signal receiving unit 2 are centralized and stored to a call information receiving unit 6 through a LAN interface unit 2-6 in each of the signal receiving units 2 and the LAN 5. An operator unit 3 as a transfer destination inquires of the storing unit 6 about the content.

As the result of that, in the second preferred embodiment of the present invention shown in FIG. 8, even if a plurality of signal receiving units 2 are disposed for improving the capacity of termination calls and the PBX 1 uses the ACD function, the user number and so forth received by each of the signal receiving units 2 can be sent to an operator as a transfer destination.

Third Preferred Embodiment of the Present Invention

A third preferred embodiment of the present invention will be described. The structure of the third preferred embodiment of the present invention is similar to that of the first preferred embodiment of the present invention shown in FIG. 3.

Figure 9:
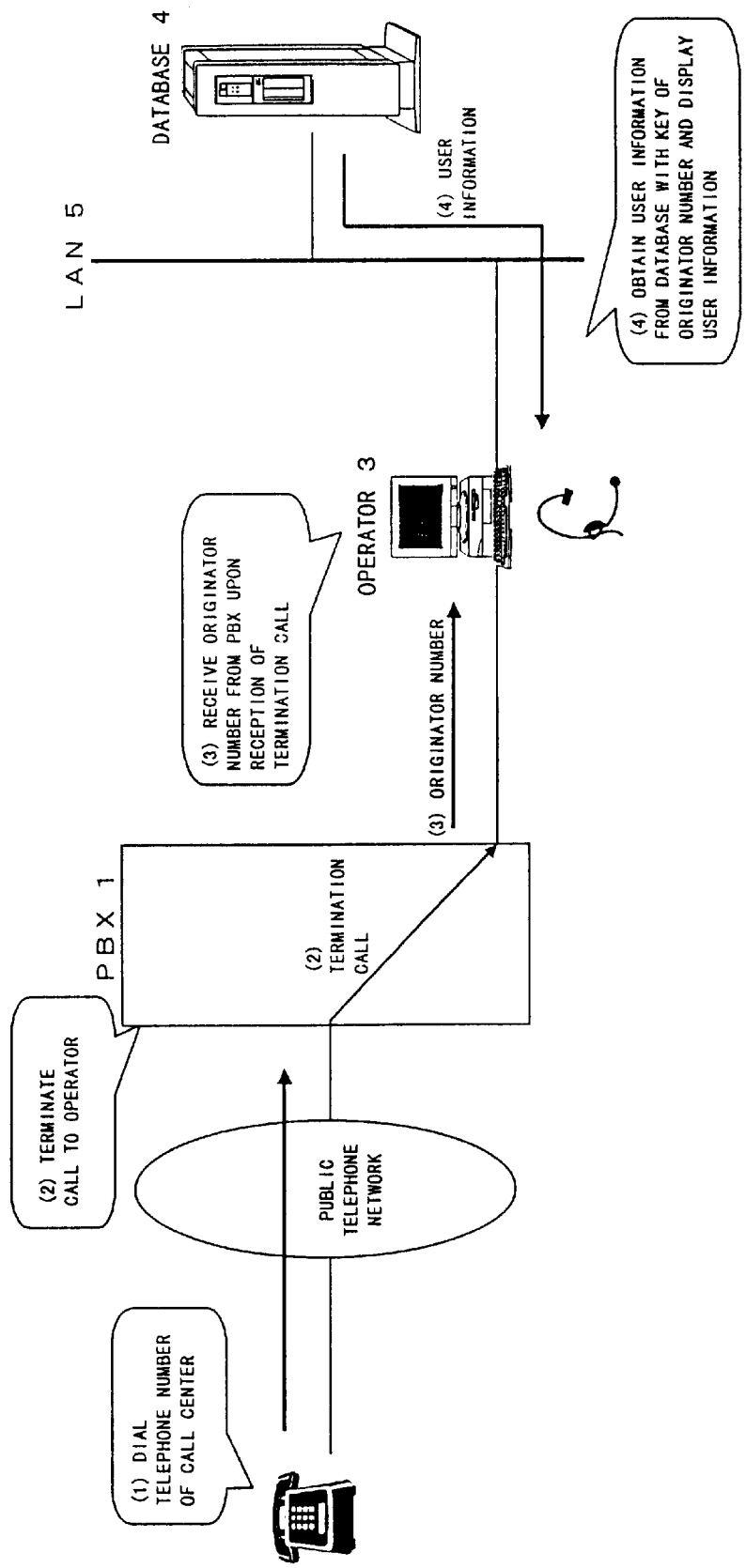
FIG. 9 is a schematic diagram for explaining the operation of a third preferred embodiment of the present invention.
Figure 10:
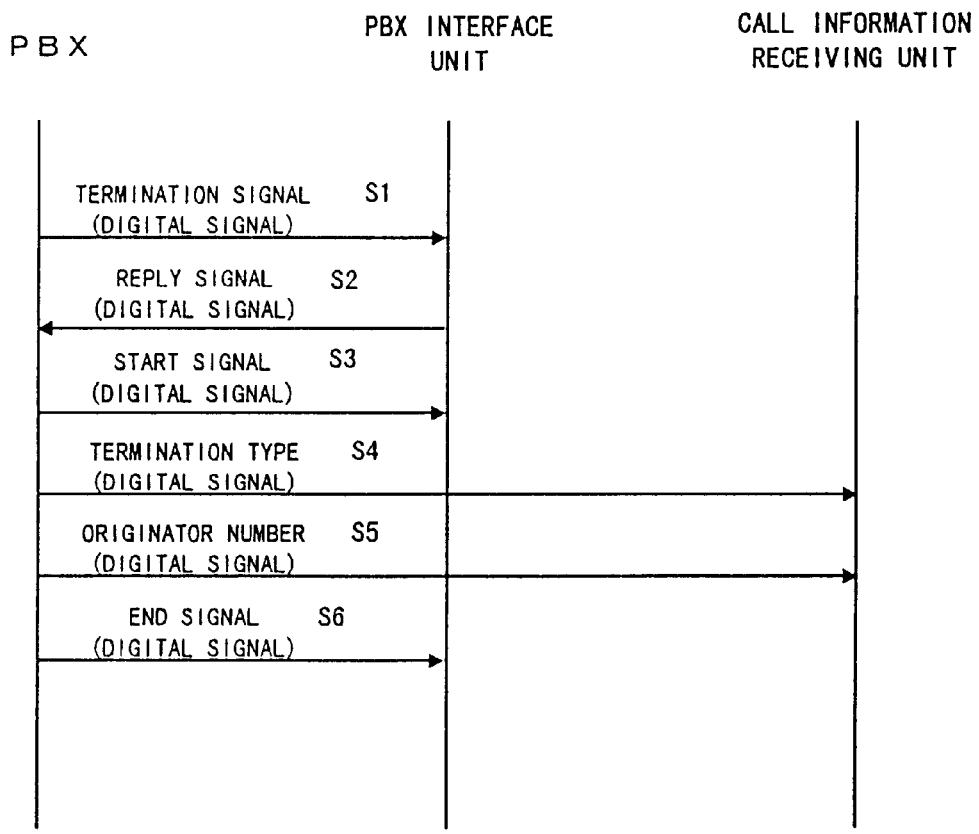
FIG. 10 is a sequence chart showing a sending operation of an originator number sent to an operator unit according to the third embodiment of the present invention (with a digital signal)

The third preferred embodiment of the present invention enables a call center system to handle both a situation of which a so-called originator number sending function is available and a situation of which the function is not available. In the following FIGS. 9 and 10, the operation will be described. FIG. 9 is a schematic diagram for explaining the operation of the third preferred embodiment. FIG. 10 is a sequence chart showing the operation of the third preferred embodiment.

First, when an originator who is a user of the system dials the telephone number of a call center, the call is terminated to a PBX 1 in the call center through a public telephone network (at step (1) in FIG. 9).

The PBX 1 terminates the termination call to one operator unit 3 with the ACD function (at step (2) in FIG. 9).

At the same time, the PBX 1 sends information about the termination call with a digital signal to the operator unit 3 (at step (3) in FIG. 9).

FIG. 10 is a sequence chart showing the originator number sending operation.

First, the PBX 1 sends a termination signal with a digital signal to a PBX interface unit 3-1 in the operator unit 3 (at step S1 in FIG. 10). In response to that, the PBX interface unit 3-1 sends a reply signal with a digital signal to the PBX 1 (at step S2 in FIG. 10).

Next, the PBX 1 sends a start signal with a digital signal to the PBX interface unit 3-1 in the operator unit 3 (at step S3 in FIG. 10). After that, the PBX 1 sends both termination type that represents a termination call with a digital signal directly (at step S4 in FIG. 10) and an originator number as digital signals (at step S5 in FIG. 10) to a call information receiving unit 3-2 in the operator unit 3 through the PBX interface unit 3-1. Thereafter, the PBX 1 sends an end signal with a digital signal to the PBX interface unit 2-1 (at step S6 in FIG. 10).

As described above, after the PBX 1 has sent the originator number of the termination call to the operator unit 3, a controlling unit 3-4 in the operator unit 3 analyzes whether or not a call information receiving unit 2-3 has received the originator number. When the call information receiving unit 2-3 has received the originator number, the controlling unit 3-4 inquires of a database 4 about user information through a LAN interface unit 3-6 and a LAN 5.

The database 4 searches the user information with a key of the originator number contained in the inquiry and sends it to the operator unit 3 through the LAN 5.

After the controlling unit 3-4 has received the user information through the LAN interface unit 3-6 in the operator unit 3 (at step (4) in FIG. 9), the user information is displayed on a displaying unit 3-3 in the operator unit 3.

Thereafter, the controlling unit 3-4 in the operator unit 3 connects a speech unit 3-5 and the user through the PBX interface unit 2-1 and the PBX 1. As a result of that, the speech between the operator and the user is started.

On the other hand, as the result of the analysis if the call information receiving unit 2-3 has received the originator number by the controlling unit 3-4, when the call information receiving unit 2-3 has not received the originator number, the controlling unit 3-4 transfers the termination call to the signal receiving unit 2.

The following control process is the same as the control process in the first preferred embodiment of the present invention. That is to say, together with receiving the call information (termination trunk information) of the transfer call from the PBX 1, the signal receiving unit 2 receives and stores the user number and so forth from the user. Thereafter, the signal receiving unit 2 transfers the termination call to the representative number (ACD group) that represents a plurality of operator units 3. Next, together with terminating the transfer call to one operator unit 3 with the ACD function, the PBX 1 sends the call information (termination trunk number) of the transfer call to the operator unit 3. Next, the operator unit 3 obtains the user number and so forth corresponding to the received call information from the signal receiving unit 2. The operator unit 3 obtains the user information corresponding to the user number and so forth from the database 4, displays the obtained user information on the display. After that, the speech between the operator and the user is started.

As described above, in the third preferred embodiment of the present invention, the system can handle both a situation of which an originator number sending function is available and a situation of which the function is not available. In addition, even if the PBX 1 is using the ACD function, when an originator number has not been received, it is enabled that the signal receiving unit 2 sends the received user number and so forth to an operator as a transfer destination.

Fourth Preferred Embodiment of the Present Invention

Figure 11:
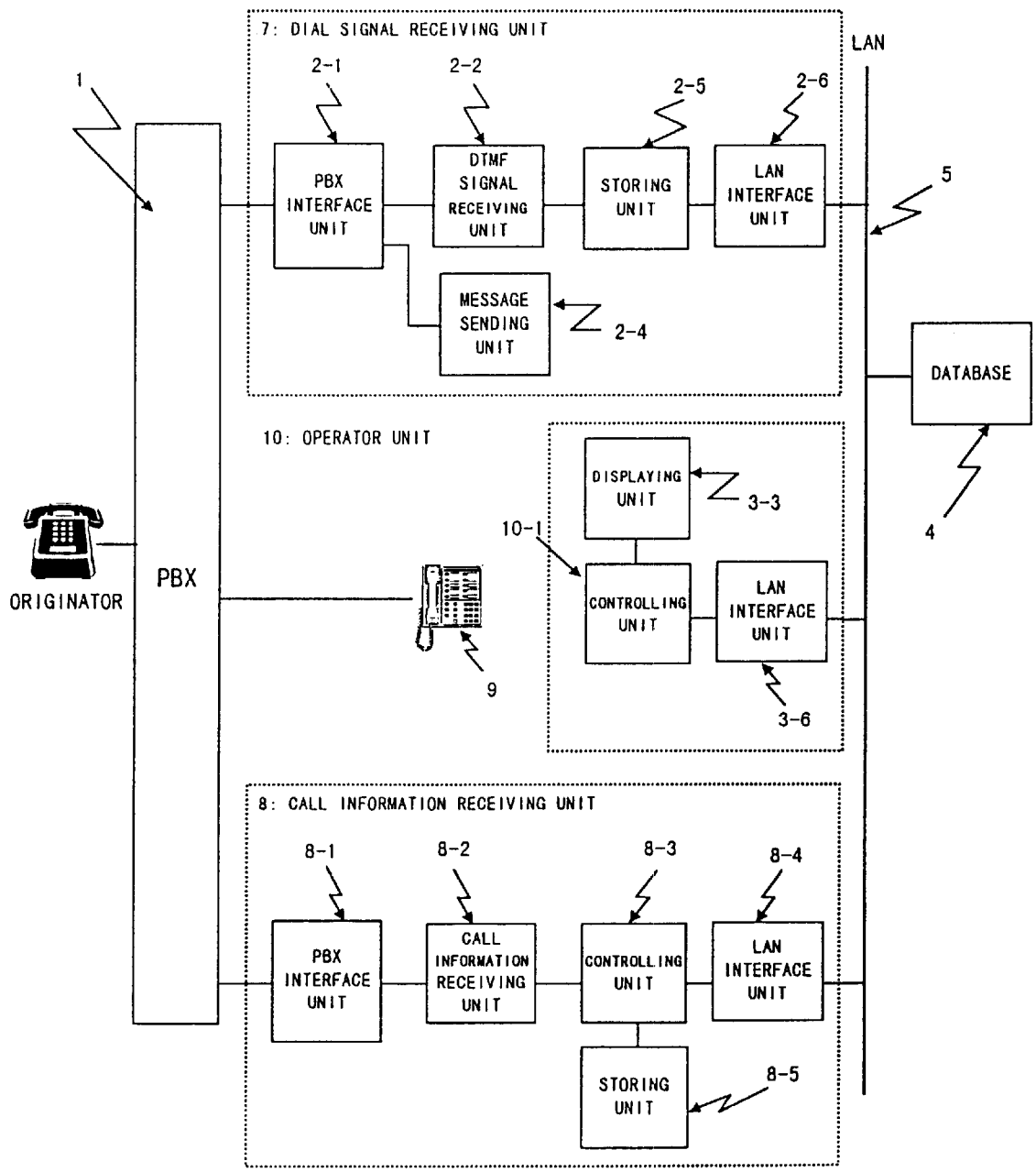
FIG. 11 is a schematic diagram showing the structure of a fourth preferred embodiment of the present invention.

FIG. 11 is a schematic diagram showing the structure according to a fourth preferred embodiment of the present invention. In FIG. 11, similar units to those of the first preferred embodiment of the present invention in FIG. 3 are denoted by similar reference numerals.

The difference between the structure shown in FIG. 11 and the structure of the first preferred embodiment shown in FIG. 3 is in that the function corresponding to the call information receiving unit 2-3 in the signal receiving unit 2 shown in FIG. 3 is accomplished by a call information receiving unit 8 as a telephony server connected to a PBX 1 alone, and that the function corresponding to the signal receiving unit 2 shown in FIG. 3 excluding the function of the call information receiving unit 2-3 is accomplished as a dial signal receiving unit 7. Moreover, the function corresponding to the operator unit 3 shown in FIG. 3 is simplified in FIG. 11, and is substituted with a conventional business phone 9 and an operator unit 10 that functions as a conventional personal computer.

Figure 12:
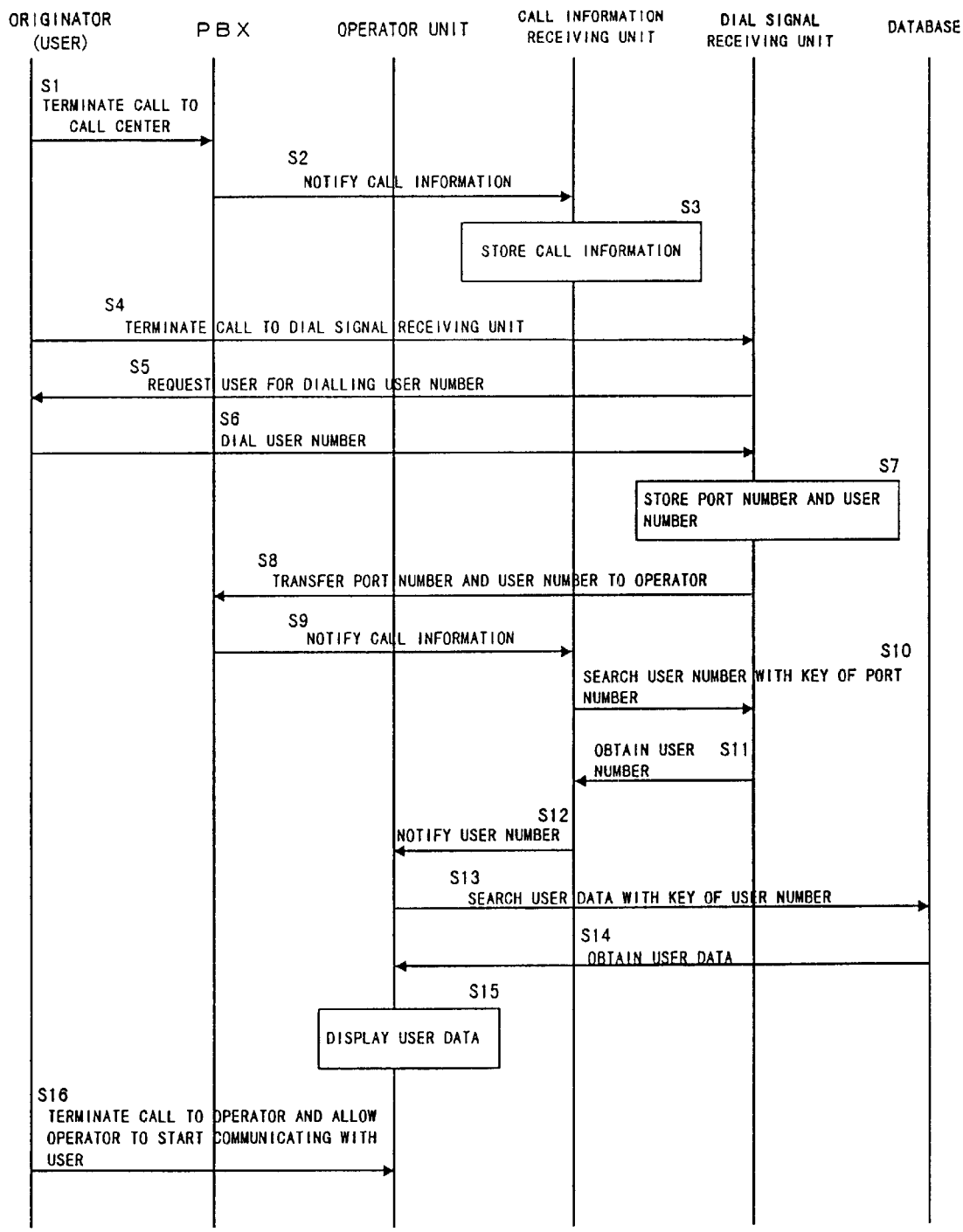
FIG. 12 is a sequence chart showing the fourth preferred embodiment of the present invention.
Figure 13:
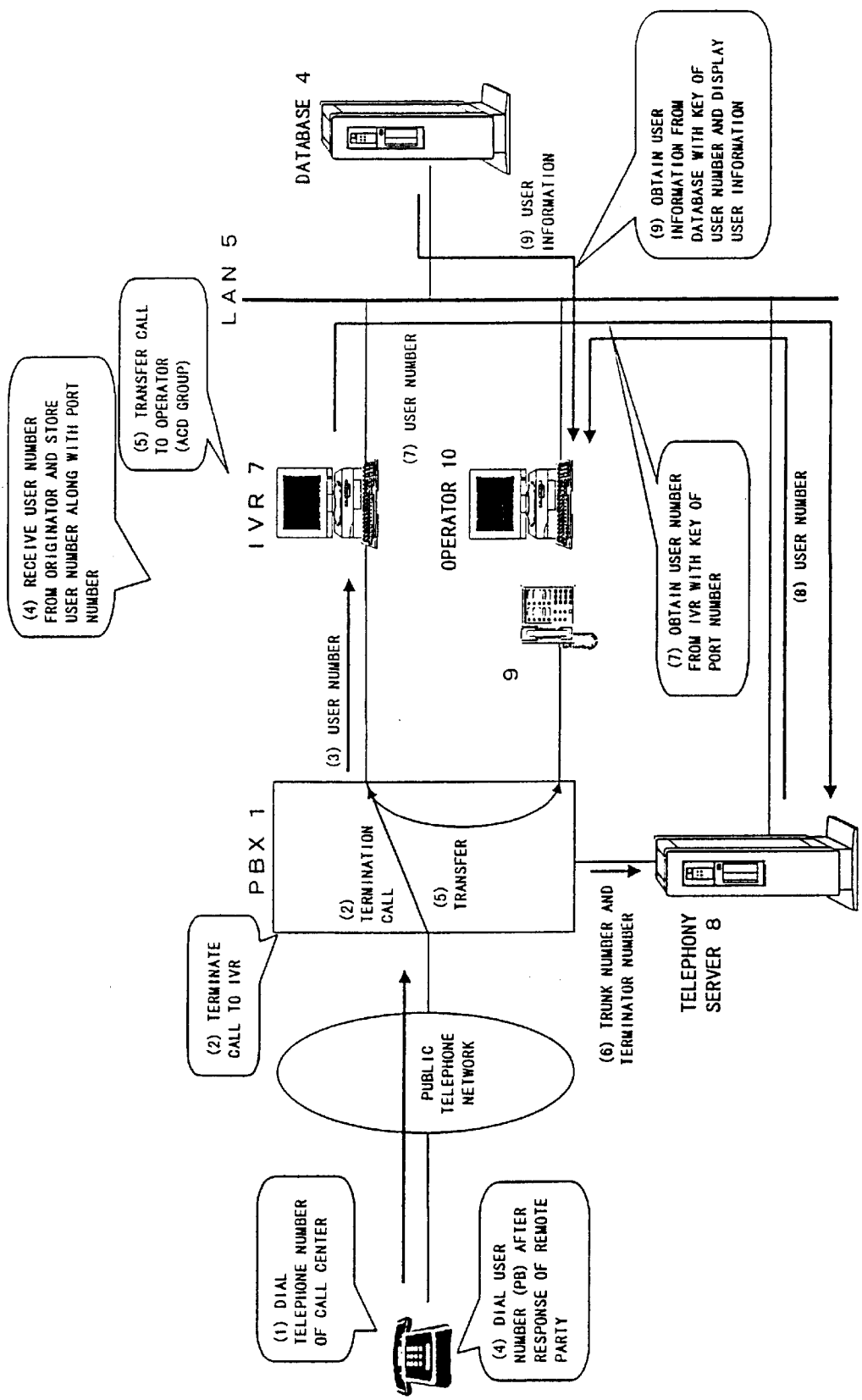
FIG. 13 is a schematic diagram for explaining the operation of the fourth preferred embodiment of the present invention.
Figure 14:
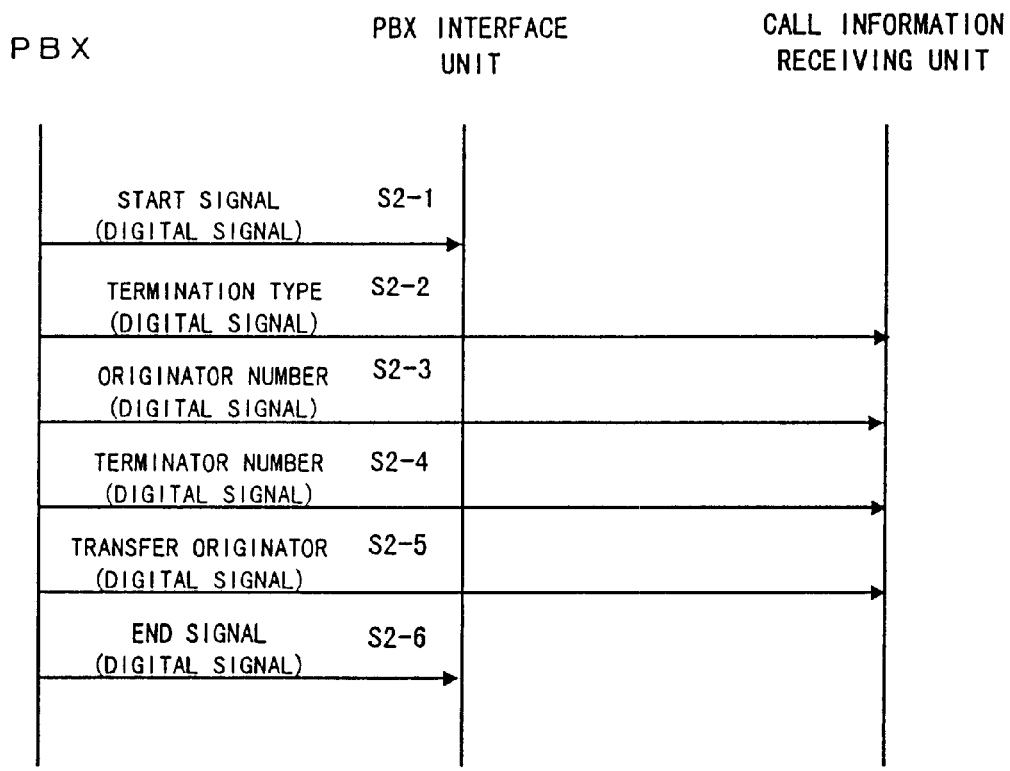
FIG. 14 is a sequence chart showing a sending operation of a termination trunk number and so forth sent to a call information receiving unit according to the fourth preferred embodiment of the present invention (No. 1) (with a digital signal)
Figure 15:
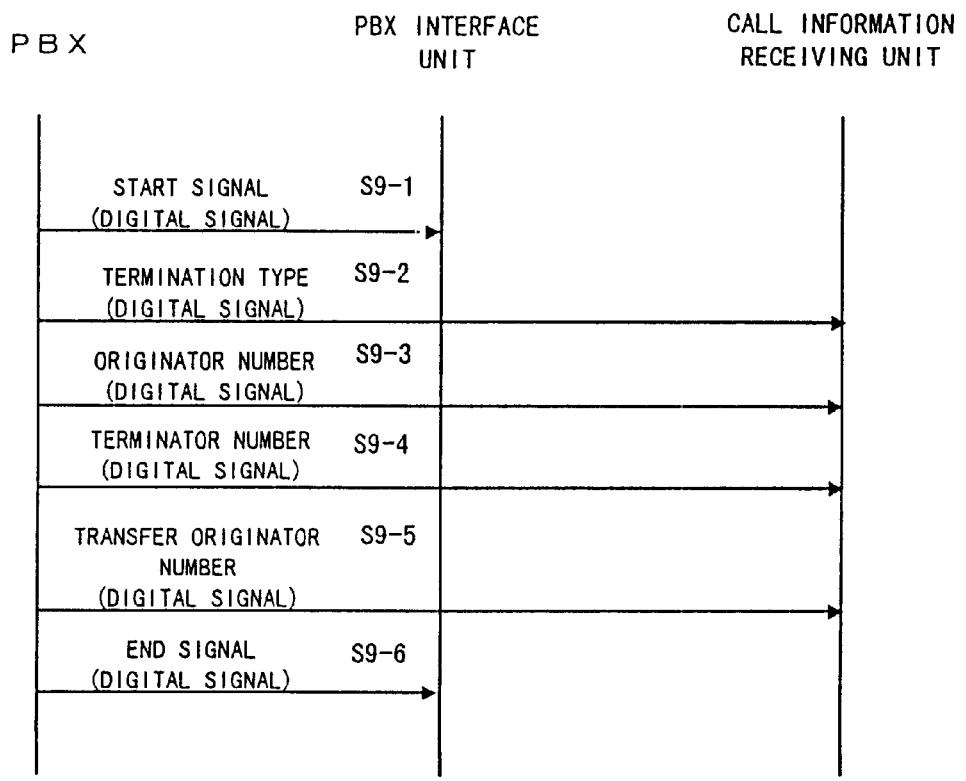
FIG. 15 is a sequence chart showing a sending operation of a termination trunk number and so forth sent to a call information receiving unit according to the fourth preferred embodiment of the present invention (No. 2) (with a digital signal)

Next, with reference to FIGS. 12, 13, 14, and 15, the operation of the fourth preferred embodiment of the present invention which has a structure shown in FIG. 11 will be described. FIGS. 12, 14, and 15 are sequence charts showing the operation of the fourth preferred embodiment. FIG. 13 is a schematic diagram for explaining the operation of the fourth preferred embodiment.

First, an originator who is a user of the system dials a telephone number of a call center. The call is terminated to the PBX 1 in the call center through a public telephone network (at step S1 in FIG. 12 and at step (1) in FIG. 13).

The PBX 1 designates a dial signal receiving unit 7 to which the termination call is terminated. At the same time, the PBX 1 sends a termination trunk number and a termination port number of the dial signal receiving unit 7 as call information with a digital signal to the call information receiving unit 8.

FIG. 14 is a sequence chart showing the sending operation for the termination trunk number and so forth.

First, the PBX 1 sends a start signal with a digital signal to a PBX interface unit 8-1 in the call information receiving unit 8 (at step S2-1 in FIG. 14). Thereafter, the PBX 1 sends a termination type (at step S2-2 in FIG. 14), an originator number (at step S2-3 in FIG. 14), a terminator number (at step S2-4 in FIG. 14), and a transfer originator number (at step S2-5 in FIG. 14) with a digital signal to a call information receiving unit 8-2 in the call information receiving unit 8 through the PBX interface unit 8-1. The termination type represents a termination call. The originator number represents a termination trunk number. The terminator number represents a termination port number of the dial signal receiving unit 7. The transfer originator number is a null value. Thereafter, the PBX 1 sends an end signal with a digital signal to the PBX interface unit 8-1 (at step S2-6 in FIG. 14).

Thus, a controlling unit 8-3 in the call information receiving unit 8 records the termination trunk number received by the call information receiving unit 8-2 and the termination port number of the dial signal receiving unit 7 to a storing unit 8-5 (at step S3 in FIG. 12).

Together with sending to the call information receiving unit 8, the PBX 1 terminates the termination call to the dial signal receiving unit 7 that is an IVR (at step S4 in FIG. 12 and at step (2) in FIG. 13).

When a PBX interface unit 2-1 in the dial signal receiving unit 7 responds to the termination call (at step S4 in FIG. 12), a message sending unit 2-4 sends a message for requesting the user for dialing a user number and so forth to the user through the PBX interface unit 2-1 and the PBX 1 (at step S5 in FIG. 12).

When the user dials the user number and so forth corresponding to the message, the user number and so forth are transferred as a DTMF signal to a DTMF signal receiving unit 2-2 in the dial signal receiving unit 7 through the PBX 1 and the PBX interface unit 2-1 in the dial signal receiving unit 7, and they are received there (at step S6 in FIG. 12 and at step (4) in FIG. 13).

As a result of that, the user number and so forth received by the DTMF signal receiving unit 2-2 in the dial signal receiving unit 7 are stored in a storing unit 2-5 along with the termination port number assigned to the dial signal receiving unit 7 as a pair (at step S7 in FIG. 12 and at step (4) in FIG. 13).

Next, the PBX interface unit 2-1 in the dial signal receiving unit 7 transfers the termination call to the representative number that represents a plurality of operator units 10 (at step S8 in FIG. 12 and at step (5) in FIG. 13).

The PBX 1 terminates the transfer call to one free business phone 9 for an operator with its ACD function (at step S8 in FIG. 12 and at step (5) in FIG. 13). At the same time, it sends the termination trunk number of the transfer call, the termination port number of the dial signal receiving unit 7 of the transfer originator, the telephone number of the business phone 9 for the operator as call information with a digital signal to the call information receiving unit 8 (at step S9 in FIG. 12 and at step (6) in FIG. 13).

FIG. 15 is a sequence chart showing the sending operation of the termination trunk number and so forth.

First, the PBX 1 sends the start signal with a digital signal to the PBX interface unit 8-1 in the call information receiving unit 8 (at step S9-1 in FIG. 15). Thereafter, the PBX 1 sends the termination type, which represents the transfer call (at step S9-2 in FIG. 15), the originator number, which represents the termination trunk number (at step S9-3 in FIG. 15), the terminator number, which represents the telephone number of the determined business phone 9 for the operator (at step S9-4 in FIG. 15), and the transfer originator number, which represents the termination port number of the dial signal receiving unit 7 (at step S9-5 in FIG. 15) as a digital signal to the call information receiving unit 8-2 in the call information receiving unit 8 through the PBX interface unit 8-1 together. After that, the PBX 1 sends the end signal with a digital signal to the PBX interface unit 8-1 (at step S9-6 in FIG. 15).

As described above, after the PBX 1 has sent the call information that are the termination trunk number and so forth of the transfer call to the call information receiving unit 8, the controlling unit 8-3 in the call information receiving unit 8 inquires of the dial signal receiving unit 7 corresponding to the termination port number received by the call information receiving unit 8-2 about the user number and so forth through the LAN interface unit 8-4 and the LAN 5 (at step S10 in FIG. 12).

A controlling unit (not shown) in the dial signal receiving unit 7 receives the inquiry through the LAN interface unit 2-6. Thereafter, the controlling unit searches the oldest user number and so forth stored in the storing unit 2-5 and sends them to the call information receiving unit 8 through the LAN interface unit 2-6 and the LAN 5. The user number and so forth are received by the controlling unit 8-3 through the LAN interface unit 8-4 in the call information receiving unit 8 (at step S11 in FIG. 12 and at step (7) in FIG. 13).

Next, the controlling unit 8-3 in the call information receiving unit 8 sends the user number and so forth to the operator unit 10 corresponding to the number of the business phone 9 for the operator that the call information receiving unit 8-2 has received as the terminator number through the LAN interface unit 8-4 and the LAN 5 (at step S12 in FIG. 12 and at step (8) in FIG. 13). The user number and so forth are received by a controlling unit 10-1 in the operator unit 10 through a LAN interface unit 3-6 in the operator unit 10.

The controlling unit 10-1 in the operator unit 10 inquires of a database 4 about the user information with a key of the received user number and so forth through the LAN interface unit 3-6 and the LAN 5 (at step S13 in FIG. 12).

The database 4 searches the user information with a key of the user number and so forth contained in the inquiry and sends the searched result to the operator unit 10 through the LAN 5.

The user information is received by the controlling unit 10-1 through the LAN interface unit 3-6 in the operator unit 10 (at step S14 in FIG. 12 and at step (9) in FIG. 13). Thereafter, the user information is displayed on a displaying unit 3-3 in the operator unit 10 (at step S15 in FIG. 12).

Thereafter, the operator starts communicating with the user using the business phone 9 in the operator unit 10 while seeing data displayed on the displaying unit 3-3 (at step S16 in FIG. 12).

In the fourth preferred embodiment of the present invention, since the call information receiving unit 8 as a telephony server connected to the PBX 1 centralizes and processes call information, the dial signal receiving unit 7 can be structured as a simple signal receiving unit that has only a function for receiving a DTMF signal. In addition, since the operator unit 10 can be structured with a conventional personal computer and so forth, in a situation that many operator units 10 are used, the cost of the system can be reduced.

Fifth Preferred Embodiment of the Present Invention

Figure 16:
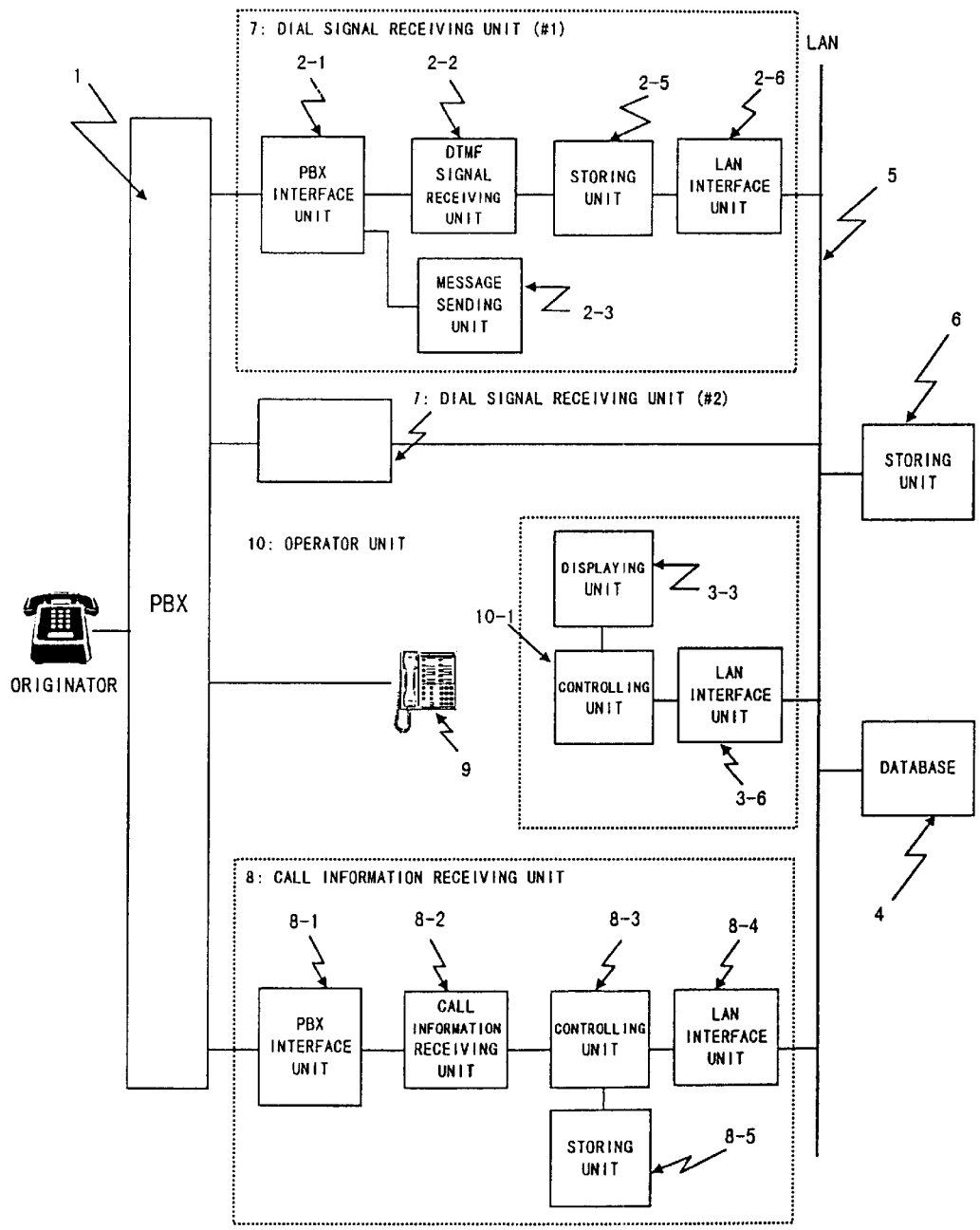
FIG. 16 is a schematic diagram showing the structure of a fifth preferred embodiment of the present invention.

FIG. 16 is a schematic diagram showing the structure of a fifth preferred embodiment of the present invention. In FIG. 16, similar units to those of the fourth preferred embodiment of the present invention in FIG. 11 are denoted by similar reference numerals.

The difference between the structure shown in FIG. 16 and the structure of the fourth preferred embodiment of the present invention shown in FIG. 11 is in that a plurality of dial signal receiving units 7 are disposed and that a storing unit 6 is newly connected to a LAN 5.

In the structure of the fourth preferred embodiment of the present invention shown in FIG. 11, the user number and so forth received by the DTMF signal receiving unit 2-2 in the dial signal receiving unit 7 are stored in the storing unit 2-5. The call information receiving unit 8 inquires of the storing unit 2-5 about the content.

On the other hand, in the structure of the fifth preferred embodiment of the present invention shown in FIG. 16, pair of a user number and so forth received by a DTMF signal receiving unit 2-2 in each dial signal receiving unit 7 and a termination port number corresponding to each dial signal receiving unit 7 are centralized and stored to the storing unit 6 from the storing unit 2-5 in each dial signal receiving unit 7 through a LAN interface unit 2-6 in each dial signal receiving unit 7 and the LAN 5. A call information receiving unit 8 inquires of the storing unit 6 about the content.

When a controlling unit 8-3 in the call information receiving unit 8 inquires of the storing unit 6 about the content, the controlling unit 8-3 designates the termination port number received by the call information receiving unit 8-2. Thus, the oldest user number and so forth stored in a storing area of the dial signal receiving unit 7 corresponding to the termination port number are searched in the storing unit 6.

Thus, in the fifth preferred embodiment shown in FIG. 16, even if a plurality of dial signal receiving units 7 are disposed for improving the capacity of the termination calls, the features of the fourth preferred embodiment of the present invention can be effectively used.

Sixth Preferred Embodiment of the Present Invention

Next, a sixth preferred embodiment of the present invention will be described. The structure of the sixth preferred embodiment of the present invention is similar to the structure of the fourth preferred embodiment of the present invention shown in FIG. 11.

Figure 17:
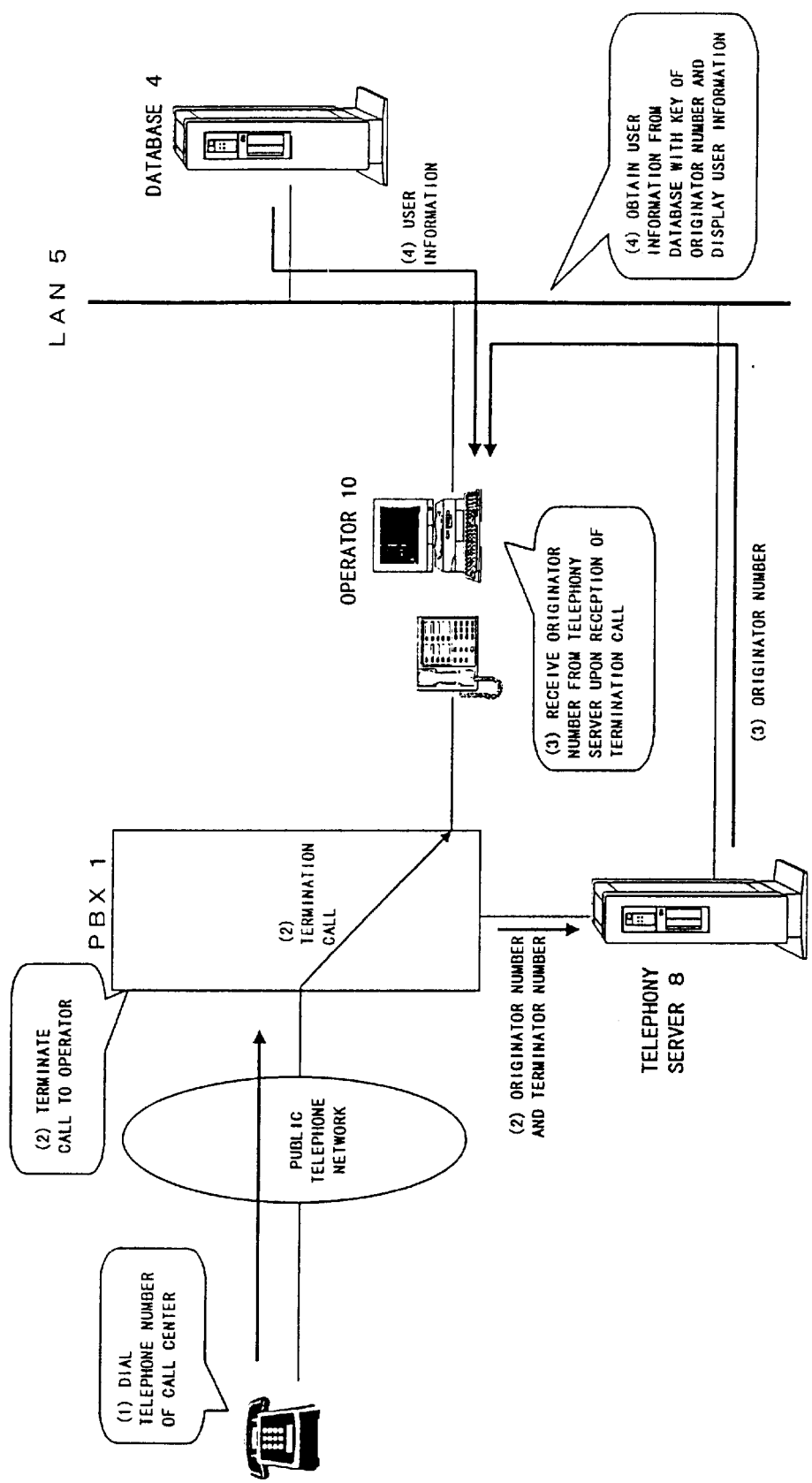
FIG. 17 is a schematic diagram for explaining the operation of the sixth preferred embodiment of the present invention.
Figure 18:
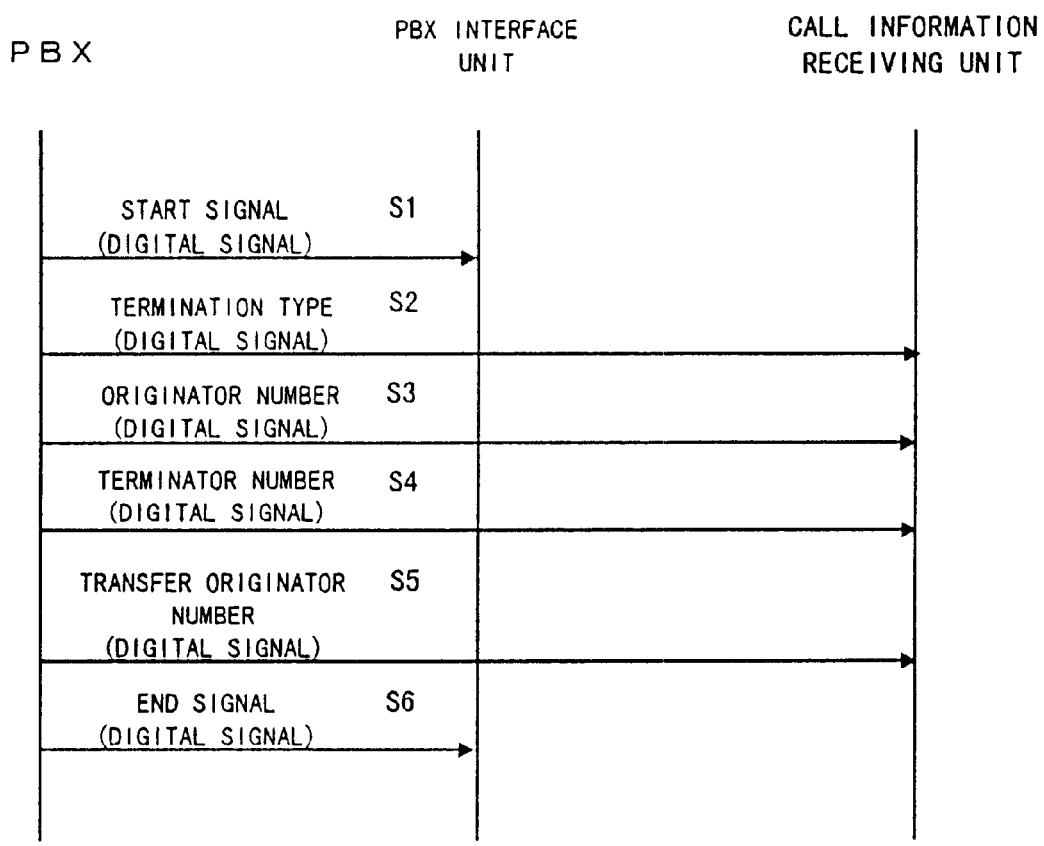
FIG. 18 is a sequence chart showing a sending operation of an originator number and so forth sent to a call information receiving unit according to the sixth preferred embodiment of the present invention (with a digital signal).

In the sixth preferred embodiment of the present invention, a call center system that can handle both a situation of which a so-called originator number sending function is available and a situation of which the function is not available is accomplished. Next, with reference to FIGS. 17 and 18, the operation of the sixth preferred embodiment will be described. FIG. 17 is a schematic diagram for explaining the operation of the sixth preferred embodiment. FIG. 18 is a sequence chart showing the operation of the sixth preferred embodiment.

First, when an originator who is a user of the system dials a telephone number of a call center, the call is terminated to a PBX 1 in the call center through a public telephone network (at step (1) in FIG. 17).

The PBX 1 designates one business phone 9 for one operator to terminate the termination call with the ACD function. Thereafter, the PBX 1 sends information about the termination call with a digital signal to a call information receiving unit 8 as a telephony server (at step (3) in FIG. 17).

FIG. 18 is a sequence chart showing the sending operation of the originator number and so forth.

First, the PBX 1 sends a start signal with a digital signal to a PBX interface unit 8-1 in the call information receiving unit 8 (at step S1 in FIG. 18). Thereafter, the PBX 1 sends a termination type that represents a direct termination call (at step S2 in FIG. 18), an originator number (at step S3 in FIG. 18), a terminator number that represents the telephone number of a designated business phone 9 for the operator (at step S4 in FIG. 18), and a transfer originator number that is a null value (at step S5 in FIG. 18) with a digital signal to a call information receiving unit 8-2 in the call information receiving unit 8 through the PBX interface unit 8-1. Next, the PBX 1 sends an end signal with a digital signal to the PBX interface unit 8-1 (at step S6 in FIG. 18).

As described above, after the PBX 1 has sent the originator number of the termination call to the call information receiving unit 8, a controlling unit 8-3 in the call information receiving unit 8 analyzes whether or not the call information receiving unit 8-2 has received the originator number. When the call information receiving unit 8-2 has received the originator number, the controlling unit 8-3 causes the PBX 1 to send the termination call to the designated business phone 9 for the operator. In addition, the controlling unit 8-3 sends the received originator number to an operator unit 10 corresponding to the telephone number of the business phone 9 that the call information receiving unit 8-2 has received as the terminator number through a LAN interface unit 8-4 and a LAN 5 (at step (3) in FIG. 17). The user number and so forth are received by a controlling unit 10-1 in the operator unit 10 through a LAN interface unit 3-6 in the operator unit 10.

The controlling unit 10-1 in the operator unit 10 inquires of a database 4 about the user information with a key of the received originator number through the LAN interface unit 3-6 and the LAN 5 (at step (4) in FIG. 17).

The database 4 searches the user information with a key of the user number and so forth contained in the inquiry and sends the searched result to the operator unit 10 through the LAN 5.

The user information is received by the controlling unit 3-4 through the LAN interface unit 3-6 in the operator unit 10. Thereafter, the user information is displayed on a displaying unit 3-3 in the operator unit 10.

On the other hand, when the call information receiving unit 2-3 has not received the originator number as the analyzed result by the controlling unit 8-3, the controlling unit 8-3 causes the PBX 1 to transfer the termination call to a dial signal receiving unit 7 through the PBX interface unit 8-1.

The controlling process that follows is the same as the controlling process accomplished in the fourth preferred embodiment of the present invention.

As described above, in the sixth preferred embodiment of the present invention, a call center system that can handle both a situation of which an originator number sending function is available and a situation of which the function is not available can be accomplished. In addition, the features of the fourth preferred embodiment of the present invention can be effectively used.

Other Preferred Embodiments

In addition, the present invention can be applied to record mediums such as a floppy disk, a CD-ROM disc, an optical disc, and a removable hard disk and so forth that store a computer program that accomplishes the functions corresponding to each apparatus of each of the above-described preferred embodiments.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A call center system for switching a termination call to a free operator unit among a plurality of operator units, comprising:

a private branch exchange exchanging a call;

a signal receiving unit receiving call information that identifies the termination call from said private branch exchange, receiving user identification information from an originator corresponding to the termination call as a DTMF signal, and storing the user identification information along with the call information corresponding to the termination call, receiving the user identification information and then instructing said private branch exchange to transfer the termination call to a free operator unit amongst the plurality of operator units, and notifying an originating source of a first inquiry of the stored user identification information through a network in response to the first inquiry that identifies the call information from the network; and a database unit storing user information corresponding to the user identification information.

wherein said free operator unit receives the call information of the termination call whose transfer is instructed by said signal receiving unit from said private branch exchange, issues a first inquiry that identifies the received call information and that inquires the user identification information to said signal receiving unit through the network, issues a second inquiry that identifies user identification information notified from said signal receiving unit in response to the first inquiry to said database unit and displays user information notified from said database unit in response to the second inquiry, and terminates the termination call whose transfer is instructed by said signal receiving unit and communicates with the originator of the termination call.

2. The system as set forth in claim 1, wherein when the termination call contains an originator number, the termination call is terminated to a relevant operator unit, the originator number being notified to the relevant operator unit as the user identification information, the relevant operator unit directly issuing a second inquiry that identifies the originator number and that inquires the user information to said database unit.

3. The system as set forth in claim 1, wherein said signal receiving unit comprises:

a call information receiving unit receiving call information that identifies the termination call from said private branch exchange;

a DTMF signal receiving unit receiving the user identification information as a DTMF signal from an originator corresponding to the termination call, and storing the user identification information along with the call information corresponding to the termination call;

a transfer controlling unit receiving the user identification information and then instructing said private branch exchange to transfer the termination call to a free operator unit amongst the plurality of operator units; and a user identification information notifying unit notifying the originator of a first inquiry of the stored user identification information through a network in response to the first inquiry that identifies the call information received from the network.

4. A computer-readable storage medium storing a program, when used and read by a computer structuring said signal receiving unit configuring the call center system as set forth in claim 1, for directing the computer to perform the operations of:

receiving call information that identifies the termination call from said private branch exchange;

receiving user identification information from an originator corresponding to the termination call as a DTMF signal, and storing the user identification information along with the call information corresponding to the termination call;

receiving the user identification information and then instructing said private branch exchange to transfer the termination call to a free operator unit amongst the plurality of the operator units; and notifying the originator of the first inquiry of the stored user identification information through a network in response to the first inquiry that identifies the call information from the network.

5. An operator unit configuring the call center system as set forth in claim 1, comprising:

a call information receiving unit for receiving call information of the termination call whose transfer is instructed by said signal receiving unit from said private branch exchange;

a user identification information inquiring unit for issuing a first inquiry that identifies the received call information and that inquires the user identification information to said signal receiving unit through the network;

a user information inquiring unit for issuing a second inquiry that identifies user identification information notified from said signal receiving unit in response to the first inquiry to said database unit and that inquires the user information;

a displaying unit for displaying user information notified from said database unit in response to the second inquiry; and a speech unit for terminating the termination call whose transfer is instructed by said signal receiving unit, and communicating with the originator of the termination call.

6. A computer-readable storage medium storing a program, when used and read by a computer structuring each of the operator units configuring the call center system as set forth in claim 1, for directing the computer to perform the operations of:

receiving call information of the termination call whose transfer is instructed by said signal receiving unit from said private branch exchange;

issuing a first inquiry that identifies the received call information and that inquires the user identification information to said signal receiving unit through the network;

issuing a second inquiry that identifies user identification information notified from said signal receiving unit in response to the first inquiry an that inquires the user information to said database unit;

displaying user information notified from said database unit in response to the second inquiry; and terminating the termination call whose transfer is instructed by said signal receiving unit, and communicating with the originator of the termination call.

7. A call center system for switching a termination call to a free operator unit among a plurality of operator units, comprising:

a private branch exchange exchanging a call;

a user identification information storing unit, connected to a network, storing user identification information and call information of a termination call corresponding thereto;

a plurality of signal receiving units each of which receiving the call information that identifies the termination call from said private branch exchange, receiving user identification information from an originator corresponding to the termination call as a DTMF signal, and storing the user identification information in said user identification information storing unit along with the call information corresponding to the termination call, receiving the user identification information and then instructing said private branch exchange to transfer the termination call to a free operator unit amongst the plurality of operator units, and a database unit storing user information corresponding to the user identification information, wherein said free operator unit receives the call information of the termination call whose transfer is instructed by said signal receiving unit from said private branch exchange, issues a first inquiry that identifies the received call information and that inquires the user identification information to said user identification information storing unit through the network, issues a second inquiry that identifies the user identification information notified from said user identification information storing unit in response to the first inquiry and that inquires the user information to said database unit and displays user information notified from said database unit in response to the second inquiry, and terminates the termination call whose transfer is instructed by said signal receiving unit and communicates with the originator of the termination call.

8. The system as set forth in claim 7, wherein when the termination call contains an originator number, the termination call is terminated to a relevant operator unit, the originator number being notified to the relevant operator unit as the user identification information, the relevant operator unit directly issuing a second inquiry that identifies the originator number and that inquires the user information to said database unit.

9. A signal receiving unit that configure the call center system as set forth in claim 7, comprising:

a call information receiving unit for receiving call information that identifies the termination call from said private branch exchange;

a DTMF signal receiving unit for receiving user identification information as a DTMF signal from an originator corresponding to the termination call, and storing the user identification information in said user identification information storing unit along with the call information corresponding to the termination call; and a transfer controlling unit for receiving the user identification information and then instructing said private branch exchange to transfer the termination call to any of the plurality of operator units.

10. A computer-readable storage medium storing a program, when used and read by a computer that structures said signal receiving unit configuring the call center system as set forth in claim 7, for directing the computer to perform the operations of:

receiving call information that identifies the termination call from said private branch exchange;

receiving user identification information from an originator corresponding to the termination call as a DTMF signal, and storing the user identification information in said user identification information storing unit along with the call information corresponding to the termination call; and receiving the user identification information and then instructing said private branch exchange to transfer the termination call to a free operator unit amongst the plurality of operator units.

11. An operator unit that structures the call center system as set forth in claim 7, comprising:

a call information receiving unit for receiving call information of the termination call whose transfer is instructed by said signal receiving unit from said private branch exchange;

a user identification information inquiring unit for issuing a first inquiry that identifies the received call information and that inquires the user identification information to said user identification information storing unit through the network;

a user information inquiring unit for issuing a second inquiry that identifies user identification information notified from said user identification information storing unit in response to the first inquiry and that inquires the user information to said database unit;

a displaying unit for displaying the user information notified from said database unit in response to the second inquiry; and a speech unit for terminating the termination call whose transfer is instructed by said signal receiving unit, and communicating with the originator of the termination call.

12. A computer-readable medium storing a program, when used and read by a computer structuring the call center system as set forth in claim 7, for directing the computer to perform the operations of:

receiving call information of the termination call whose transfer is instructed by said signal receiving unit from said private branch exchange;

issuing a first inquiry that identifies the received call information and that inquires the user identification information to said user identification information storing unit through the network; issuing a second inquiry that identifies user identification information notified from said user identification information storing unit in response to the first inquiry and that inquires the user information to said database unit;

displaying user information notified from said database unit in response to the second inquiry; and terminating the termination whose transfer is instructed by said signal receiving unit, and communicating with the originator of the termination call.

13. A call center system for switching a termination call to a free operator unit among a plurality of operator units, comprising:

a private branch exchange exchanging a call;

a user identification information receiving unit receiving user identification information of an originator corresponding to the termination call as a DTMF signal from said private branch exchange, and storing the user identification information, receiving the user identification information and then instructing said private branch exchange to transfer the termination call to a free operator unit amongst the plurality of operator units, and in response to a first inquiry received from a network, notifying the originator of the first inquiry of the stored user identification information through the network;

a call information receiving unit receiving call information of the termination call whose transfer is instructed by said user identification information receiving unit from said private branch exchange, issuing the first inquiry that identifies the received call information and that inquires the user identification information to said user identification information receiving unit through the network, and transferring the user identification information notified from said user identification information receiving unit in response to the first inquiry to said free operator unit at a transfer destination of the termination call whose transfer is instructed by said user identification information receiving unit, wherein said free operator unit issues a second inquiry that identifies the user identification information notified from said call information receiving unit and that inquires the user information to said database unit and displays the user information notified from said database unit in response to the second inquiry, and terminates the termination call whose transfer is instructed by said signal receiving unit and communicates with the originator of the termination call.

14. The system as set forth in claim 13, wherein when the termination call contains an originator number, the termination call is terminated to a relevant operator unit, the originator number being notified as the user identification information to the relevant operator unit, the relevant operator unit directly issuing the second inquiry that identifies the originator number and that inquires the user information to said database unit.

15. The system as set forth in claim 13, wherein said user identification information receiving unit comprises:
  a DTMF signal receiving unit receiving user identification information of an originator corresponding to the termination call as a DTMF signal from said private branch exchange, and storing the user identification information;
  a transfer controlling unit receiving the user identification information and then instructing said private branch exchange to transfer the termination call to a free operator unit amongst the plurality of operator units; and
  a user identification information notifying unit notifying the stored user identification information to the originator of the first inquiry through the network in response to the first inquiry from the network.

16. A computer-readable storage medium storing a program, when used and read by a computer structuring the call center system as set forth in claim 13, for directing the computer to perform the operations of:
  receiving user identification information from an originator corresponding to the termination call as a DTMF signal from said private branch exchange, and storing the user identification information;
  receiving the user identification information and then instructing said private branch exchange to transfer the termination call to a free operator unit amongst the plurality of operator units; and
  notifying the originator of the first inquiry of the stored user identification information through a network in response to the first inquiry from the network.

17. The system as set forth in claim 13, wherein said call information receiving unit comprises:
  a call information receiving unit receiving call information of the termination call whose transfer is instructed by said user identification information receiving unit from said private branch exchange;
  a user identification information inquiring unit issuing a first inquiry that identifies the received call information and that inquires the user identification information to said user identification information receiving unit through the network; and
  a user identification information transferring unit transferring the user identification information notified from said user identification information receiving unit in response to the first inquiry to an operator unit at a transfer destination of the termination call whose transfer is instructed by said user identification information receiving unit.

18. A computer-readable storage medium storing a program, when used and read by a computer configuring the call center system as set forth in claim 13, for directing the computer to perform the operations of:
  receiving call information of the termination call whose transfer is instructed by said user identification information receiving unit from said private branch exchange;
  issuing a first inquiry that identifies the received call information and that inquires the user identification information to said user identification information receiving unit through the network; and
  transferring user identification information notified from said user identification information receiving unit in response to the first inquiry to an operator unit at a transfer destination of the termination call whose transfer is instructed by said user identification information receiving unit.

19. An operator unit that structure the call center system as set forth in claim 13, comprising:
  a user information inquiring unit for issuing a second inquiry that identifies the user identification information notified from said call information receiving unit and that inquires the user information to said database unit; and
  a displaying unit for displaying the user information notified from said database unit in response to the second inquiry.

20. A computer-readable storage medium, when used and read by a computer structuring said operator unit configuring the call center system as set forth in claim 13, for directing the computer to perform the operations of:
  issuing a second inquiry that identifies the user identification information notified from said call information receiving unit and that inquires the user information to said database unit; and
  displaying user information notified from said database unit in response to the second inquiry.

21. A call center system for switching a termination call to a free operator unit among a plurality of operator units, comprising:
  a private branch exchange exchanging a call;
  a user identification information storing unit, connected to a network, storing user identification information along with port information of said private branch exchange that has received the user identification information;
  a plurality of user identification information receiving units, each of which receiving the user identification information of an originator corresponding to the termination call as a DTMF signal from said private branch exchange, and storing the user identification information in said user identification information storing unit along with the port information of said private branch exchange that has received the call information, and receiving the user identification information and then instructing said private branch exchange to transfer the termination call to a free operator unit amongst the plurality of operator units;

a call information receiving unit receiving call information of the termination call whose transfer is instructed by said user identification information receiving unit from said private branch exchange, and port information of said private branch exchange to which the user identification information is sent, issuing a first inquiry that identifies the received call information and port information and that inquires the user identification information to said user identification information storing unit through the network, and transferring user identification information notified from said user identification information storing unit in response to the first inquiry to said free operator unit at a transfer destination of the termination call whose transfer is instructed by said user identification information receiving unit, wherein the free operator unit issues a second inquiry that identifies the user identification information notified from said call information receiving unit and that inquires the user information to said database unit, displays user information notified from said database unit in response to the second inquiry, and terminating the termination call whose transfer is instructed by said signal receiving unit and communicates with the originator of the termination call.

22. The system as set forth in claim 21, wherein when the termination call contains an originator number, the termination call is terminated to a relevant operator unit, the originator number being notified as the user identification information to the relevant operator unit, the relevant operator unit directly issuing the second inquiry that identifies the originator number and that inquires the user information to said database unit.

23. The system as set forth in claim 21, wherein said user identification information receiving unit comprises:

a DTMF signal receiving unit receiving user identification information of an originator corresponding to the termination call as a DTMF signal from said private branch exchange, and storing the user identification information in said user identification information storing unit along with port information of said private branch exchange that has received the call information; and a transfer controlling unit receiving the user identification information and then instructing said private branch exchange to transfer the termination call to a free operator unit amongst the plurality of operator units.

24. A computer-readable storage medium storing a program, when used and read by a computer that structures said user identification information receiving unit configuring the call center system as set forth in claim 21, for directing the computer to perform the operations of:

receiving user identification information of on originator corresponding to the termination call as a DTMF signal from said private branch exchange, and storing the user identification information in said user identification information storing unit along with port information of said private branch exchange that has received the call information; and receiving the user identification information and then instructing said private branch exchange to transfer the termination call to a free operator unit amongst the plurality of operator units.

25. The system as set forth in claim 21, wherein said call information receiving unit that structuring the call center system as set forth in claim 21, comprising:

a call information/port information receiving unit for receiving call information of the termination call whose transfer is instructed by said user identification information receiving unit from said private branch exchange along with port information of said private branch exchange to which the user identification information is sent;

a user identification information inquiring unit for issuing a first inquiry that identifies the received call information and port information and that inquires the user identification information to said user identification information storing unit through the network; and a user identification information transferring unit for transferring user identification information notified from said user identification information storing unit in response to the first inquiry to an operator unit at a transfer destination of the termination call whose transfer is instructed by said user identification information receiving unit.

26. A computer-readable storage medium storing a program, when used and read by a computer structuring said call information receiving unit configuring the call center system as set forth in claim 21, for directing the computer to perform the operations of:

receiving call information of the termination call whose transfer is instructed by said user identification information receiving unit from said private branch exchange along with port information of said private branch exchange to which the user identification information is sent;

issuing a first inquiry that identifies the received call information and port information and that inquires the user identification information to said user identification information storing unit through the network; and transferring the user identification information notified from said user identification information storing unit in response to the first inquiry to an operator unit at a transfer destination of the termination call whose transfer is instructed by said user identification information receiving unit.

27. An operator unit that structures the call center system as set forth in claim 21, comprising:

a user information inquiring unit for issuing a second inquiry that identifies the user identification information notified from said call information receiving unit and that inquires the user information to said database unit; and a displaying unit for displaying user information notified from said database unit in response to the second inquiry.

28. A computer-readable storage medium storing a program, when used and read by a computer structuring said operating unit configuring the call center system as set forth in claim 21, for directing the computer to perform the operations of:

issuing a second inquiry that identifies the identification information notified from said call information receiving unit and that inquires the user information to said database unit; and displaying user information notified from sa database unit in response to the second inquiry.

29. A call center system for switching a termination call to a free operator unit among a plurality of operator means, comprising:

private branch exchange means for exchanging a call;

user identification information storing means, connected to a network, for storing user identification information along with port information of said private branch exchange that has received the user identification information;

a plurality of user identification information receiving means, each of which is capable of receiving the user identification information of an originator corresponding to the termination call as a DTMF signal from said private branch exchange, and storing the user identification information in said user identification information storing means along with the port information of said private branch exchange that has received call information, and for receiving the user identification information and then instructing said private branch exchange means to transfer the termination call to a free operator unit amongst the plurality of operator means;

call information receiving means for receiving the call information of the termination call whose transfer is instructed by said user identification information receiving means from said private branch exchange means, and port information of said private branch exchange means to which the user identification information is sent, for issuing a first inquiry that identifies the received call information and port information and that inquires the user identification information to said user identification information storing means through the network, and for transferring user identification information notified from said user identification information storing means in response to the first inquiry to said free operator unit at a transfer destination of the termination call whose transfer is instructed by said user identification information receiving means, wherein said free operator unit issues a second inquiry that identifies the user identification information notified from said call information receiving means and that inquires the user information to a database means, displays user information notified from said database means in response to the second inquiry, and terminates the termination call whose transfer is instructed by said signal receiving means, and communicates with the originator of the termination call, wherein said user identification information receiving means comprising;

DTMF signal receiving means for receiving user identification information of an originator corresponding to the termination call as a DTMF signal from said private branch exchange means, and for storing the user identification information in said user identification information storing means along with port information of said private branch exchange means that has received the call information; and transfer controlling means for receiving the user identification information and then instructing said private branch exchange to transfer the termination call to said free operator unit amongst the plurality of operator means.

\* \* \* \* \*